United States Patent
Karron et al.

[11] Patent Number: 5,898,793
[45] Date of Patent: Apr. 27, 1999

[54] SYSTEM AND METHOD FOR SURFACE RENDERING OF INTERNAL STRUCTURES WITHIN THE INTERIOR OF A SOLID OBJECT

[76] Inventors: Daniel Karron, 333 E. 30th St., New York, N.Y. 10016; James Cox, 2900 Bedford Ave., Brooklyn, N.Y. 11210; Bhubaneswar Mishra, 4 Washington Square Village, New York, N.Y. 10012

[21] Appl. No.: 08/046,245

[22] Filed: Apr. 13, 1993

[51] Int. Cl.$^6$ .................................................. G06K 9/00
[52] U.S. Cl. ...................................... 382/131; 382/154
[58] Field of Search ............... 364/413.13, 413.19, 364/413.22; 382/6, 41, 54, 128, 131, 154; 395/119, 120, 124; 345/133, 139, 419, 420, 424; 128/922

[56] References Cited

U.S. PATENT DOCUMENTS

| | | | |
|---|---|---|---|
| 4,525,858 | 7/1985 | Cline et al. | 382/1 |
| 4,710,876 | 12/1987 | Cline et al. | 364/414 |
| 4,719,585 | 1/1988 | Cline et al. | 364/518 |
| 4,729,098 | 3/1988 | Cline et al. | 364/414 |
| 4,751,643 | 6/1988 | Lorensen et al. | 364/414 |
| 4,791,567 | 12/1988 | Cline et al. | 364/413.13 |
| 4,821,210 | 4/1989 | Rumbaugh | 364/518 |
| 4,821,213 | 4/1989 | Cline et al. | 364/522 |
| 4,831,528 | 5/1989 | Crawford et al. | 364/413.22 |
| 4,879,668 | 11/1989 | Cline et al. | 364/522 |
| 4,885,688 | 12/1989 | Crawford | 364/413.22 |
| 4,984,157 | 1/1991 | Cline et al. | 364/413.13 |
| 5,113,357 | 5/1992 | Johnson et al. | 395/124 |
| 5,166,876 | 11/1992 | Cline et al. | 364/413.13 |

FOREIGN PATENT DOCUMENTS

| | | | |
|---|---|---|---|
| 0 463 700 | 1/1992 | European Pat. Off. | G06F 15/72 |

OTHER PUBLICATIONS

"The Asymptotic Decider: Resolving the Ambiguity in Marching Cubes," by Gregory M. Nielson and Bernd Hamann, Computer Science, Arizona State University, Tempe, Arizona 85287–5406, pp. 83–91.

*Primary Examiner*—Andrew W Johns
*Attorney, Agent, or Firm*—Pennie & Edmonds LLP

[57] ABSTRACT

A system and method for surface rendering and for the display and analysis of arbitrary structures within the interior of a solid body is presented. The method uses as a starting point a voxel element which is known to be crossed by a surface of interest. The surface is rendered in a topologically consistent way by connecting encountered surface hits at each voxel face. A pair of voxel face hits, surrounding a vertex value exceeding the surface value are used to form a triangle, spun around a third articulating point in the interior of the voxel. Voxel faces sharing the surface hits are sequentially examined, and a set of approximation triangles is formed, to build a triangularization grid. The rendered surfaces are interactively displayed and analyzed for global structure properties.

28 Claims, 20 Drawing Sheets

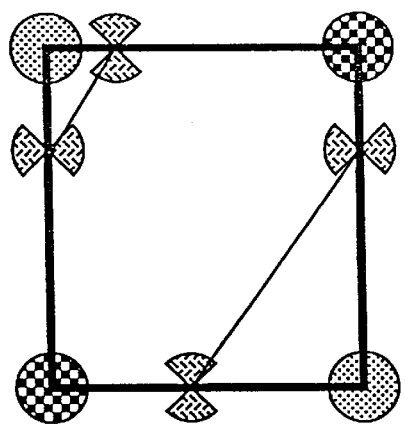
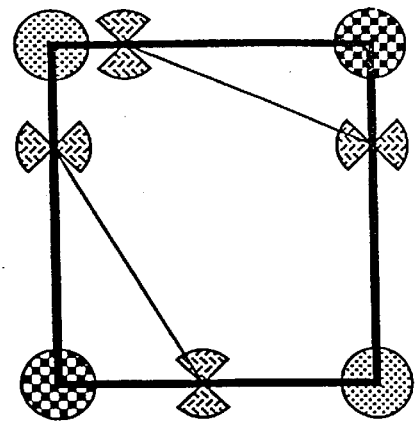
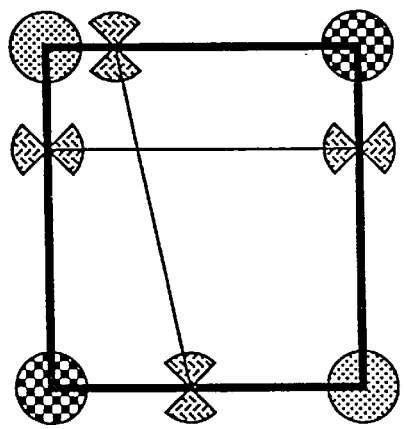
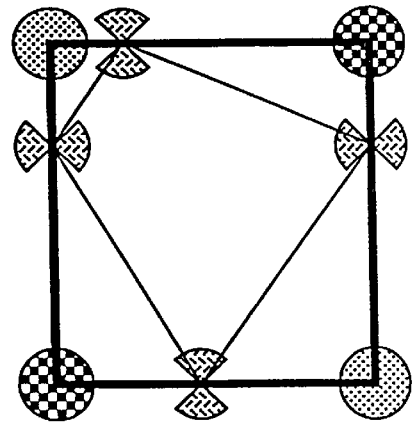
A
B
C
D
 Inside Vertex    Outside Vertex    Hit
Fig. 8

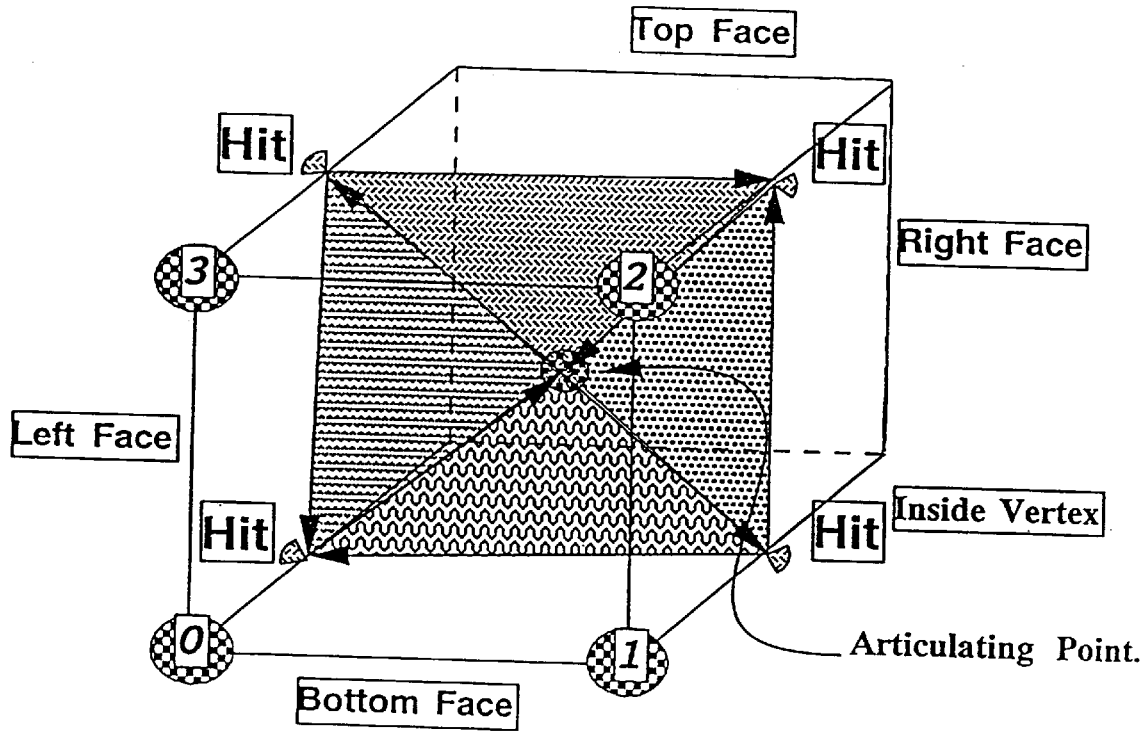
 Inside Vertex
Fig. 10

| | |
|---|---|
| 300 | RETRIEVE SEED VERTEX |
| 310 | SCAN THE THREE EDGES ASSOCIATED WITH THE SEED VERTEX UNTIL A HIT IS FOUND |
| 320 | COMPARE THE VERTEX VALUES OF ANY EDGE HAVING A HIT TO THE SURFACE THRESHOLD AND CACULATE THE HIT LOCATION |
| 330 | FOR EACH EDGE WITH A HIT, STARTING FROM THE INSIDE VERTEX SCAN THE THREE REMAINING EDGES OF THE ASSOCIATED TWO VOXEL FACES CONSECUTIVELY, UNTIL A SECOND HIT IS FOUND AT EACH FACE |
| 340 | COMPUTE LOCATIONS OF THE HITS AND FORM TRIANGLES WITH A NARTICULATING POINT (AP) IN THE INTERIOR OF THE VOXEL |
| 350 | IF TWO HITS ARE FOUND ON THE THIRD VOXEL FACE PASSING THROUGH THE INSIDE VERTEX, CONNECT THESE HITS AND FORM A TRIANGLE WITH THE SAME ARTICULATING POINT. COMPUTE LOCATION OF THE ARTICULATING POINT AND TRIANGLE NORMAL |
| 360 | IF A HIT IS FOUND ON A VOXEL FACE WHICH DOES NOT PASS THROUGH THE INSIDE VERTEX, GO TO STEP 330 SCANNING ONLY EDGES PREVIOUSLY NOT PROCESSED |
| 370 | COMPUTE TRIANGLE AND SHARED NORMALS |
| 380 | FOR EACH VOXEL EDGE WITH A HIT GO TO 320 |
| 390 | EXIT TO STORAGE AND DISPLAY PROCESSOR |

FIG. 12

SYSTEM AND METHOD FOR SURFACE RENDERING OF INTERNAL STRUCTURES WITHIN THE INTERIOR OF A SOLID OBJECT

FIELD OF THE INVENTION

This invention generally relates to a system and method for surface rendering and more particularly to a system and method for the display and analysis of arbitrary three dimensional surface structures.

BACKGROUND OF THE INVENTION

In many practical applications it is required to obtain and analyze three-dimensional (3D) arrays of data representing one or more physical properties at regular grid positions within the interior of solid bodies. Typically, the data is obtained by methods such as computer axial tomography (CAT), x-ray scanning, nuclear magnetic resonance (NMR) imaging systems, or by other non-intrusive mechanisms such as ultrasound scanning, positron emission tomography (PET), emission computer tomography (ECT) and multimodality imaging (MMI). Each of these techniques produces a planar, grid-like array of values for a continuous sequence of planes or slices of the solid object, thus providing a three-dimensional array of values. A typical application is in medicine where the solid object can be a human body or a part of it and the objective is to detect and model certain internal structures for diagnostic and surgical planning purposes. The methods to which the present invention relates are, however, equally applicable to other natural or artificial bodies and fields of study.

Examples of the physical properties measured at regular 3D positions include the coefficient of x-ray absorption in the CAT case or, for NMR imaging, the spin-spin or the spin-lattice relaxation parameters. In each case, the measured physical values reflect variations in the composition, density or structural characteristics of the underlying physical objects, providing knowledge about their internal structure. The 3D data array typically corresponds to a plurality of measurements of the given physical property, taken at regular intervals along an appropriately selected system of 3D (X, Y, Z) physical coordinates. Each measurement $V_{XYZ}$ of the physical property is thus associated with a specific array index position in a cubic lattice within the volume in study. A cubically adjacent set of eight such positions defines an unit cubic volume of the body under study and is known in the art as a voxel.

It is further known in the prior art to utilize such three-dimensional arrays of interior physical values to generate visual images of the structures within the body on a display system. In order to display two-dimensional (2D) images of such 3D interior structures, however, it is necessary to locate the position of the surface of such structure within the array of physical values. This is accomplished by comparing the array values to a threshold value or to a range of threshold values which correspond to the physical property values normally associated with that surface.

For example, in the case of the human body, bones, brain or any other tissues can be characterized by the known range of their density values which is compared to the measured and stored 3D array values in order to separate out a surface model of their structure. The displayed visual images can next be used to assist the medical practitioner in providing a diagnosis or in the planning of complex surgical procedures.

Once the location of the surface of an internal structure is determined, this surface is typically illuminated and shaded so as to give the human eye the impression of a natural shape and spatial disposition of the surface when it is displayed. Normally, to provide such shading the angular direction of a vector orthogonal to the surface at each point on the surface (the surface normal) is compared to the viewing angle of the observer. The intensity of shading can be adjusted to be proportional to the difference between these angles.

There are several problems associated with the surface rendering of structures in the interior of a solid body. First, it is necessary to accurately determine which of the voxel elements of the 3D array have been crossed by the surface of interest and at which physical location. Next, it is important to provide a mechanism for displaying the internal structure of a three-dimensional body on the two-dimensional computer or TV screen. Another important problem is that data acquired from physical data collections systems is often noisy and is not capable of being directly displayed prior to some kind of a filtering operation.

Several solutions have been proposed in the past to address these problems. An approach that is frequently used is the one described in U.S. Pat. No. 4,710,876 to Cline et al. on the so-called "marching cubes". In this method, the surface segment intersecting a voxel is approximated by one of a limited number of standardized plane polygonal surfaces intersecting the voxel. One particular standardized surface tiling is selected from a library of available surfaces by a vector which represents the binary differences between the threshold value for the given surface of interest and the eight voxel vertex values. The surface-to-voxel intersection coordinates, as well as the vector normal to the surface for each such standardized polygonal surface tiling can be obtained by table look-up techniques. The final surface is assembled as a mosaic using all the standardized triangular tiles.

The marching cubes method has found significant acceptance in the industry because it is relatively simple to implement and is fast. Several modifications have been proposed since 1987. For instance, in U.S. Pat. No. 4,729,098 granted in March 1988 to Cline et al. a variation of the marching cubes methods is proposed, in which non-linear interpolation is used to more accurately locate the coordinates of the standardized polygons.

Another known method for approximating the surface of an internal structure is the so-called "dividing cubes" method, disclosed in U.S. Pat. No. 4,719,585 to Cline et al. In this method, the values at the vertices of the voxel are used to interpolate in three dimensions values at regularly positioned intra-voxel sub-grid locations. The interpolated sub-grid values can then be used to locate the surface position and calculate the normal vector more accurately.

In order to distinguish between different internal structures having the same or similar physical property and thus having close or similar values on the three-dimensional grid, U.S. Pat. No. 4,751,643 to Lorensen discloses a technique for labeling surfaces with similar property values and using adjacency criteria in respect to a "seed location" in the particular structure of interest to segregate the desired surface from all of the labeled surfaces.

U.S. Pat. No. 4,791,567 to Cline et al. discloses another technique of segregating similar internal structures by determining connectivity from adjacency information. U.S. Pat. No. 4,821,213 to Cline et al. discloses yet another technique for differentiating internal structures in which a linear path is made through the data array to locate and label all different structures along the scan line by counting structure interfaces.

In the methods described above, voxels within the solid object under study are typically traversed sequentially and progressively, so that every voxel within the data space is checked for a crossing by the surface of interest, and is subsequently assigned to belong either to the outside or to the inside of the surface. Because of the large volumes of data to be processed, the methods are computationally intensive and relatively slow. An improvement in this respect is described in U.S. Pat. No. 5,166,876 to Cline, issued in November 1992. The disclosed method significantly speeds up the rendering of a surface within a boundary by only processing voxels on the surface. This approach saves significant computation time but still uses the same case table and the limited set of approximating surfaces which were described in the original marching cubes patent.

As noted above, the marching cubes surface rendering method is widely accepted but has certain deficiencies. These deficiencies are generally related to the fact that the fifteen canonical cases used in the surface segments' approximation do not cover the entire spectrum of possible tiling combinations. This results in occasional approximation errors, occurring at lower levels of resolution, specifically if a voxel face is intersected by the surface twice resulting in four crossings ("hits") with the voxel edge. The errors manifest themselves in incorrect surface rendering, visually appearing as unexpected spots, tears and missing tile elements. The problems are aggravated if the collection data is noisy and/or with low contrast.

A number of corrections to the marching cube algorithm have been offered in the past. Notable is a paper by Neilson and Hamann, "The Asymptotic Decider: Resolving the Ambiguity in Marching Cubes," in the Proceedings of Visualization 1991, pp. 83–91. This and other publications show that the case table approach produces inconsistent results in some cases. Thus, no topologically correct algorithm for isosurface tiling has been offered so far. Accordingly, reliable measurements of internal structure parameters, such as surface area and volume, are also not available.

The display of 3D graphic images has been principally driven by the goals and directions of computer aided design (CAD) and computer aided manufacturing (CAM) systems. Systems accepting data in several basic formats have been developed for displaying solid bodies and manipulating images in various ways to create models of parts being manufactured, or internal organs being monitored.

The present systems for surface rendering and display are, however, still incapable of meeting the requirements for a fast and truly interactive display of continuously monitored 3D data. The complexity of the task can be better appreciated by noting that a typical surface rendering operation involves processing on the order of 512×512×512 pixels. In the presence of noise the task becomes even more complicated because of the necessity for additional noise filtering, smoothing and data interpolation, which takes processing time and often results in the loss of important structural details.

It is thus desirable to provide a method for rendering topologically correct surface approximations of arbitrary internal structures within a volume of interest and a system for the display and analysis of such surface structures. It is also desirable to provide high quality, interactive display of the surface structures of interest from a set of collected data and minimize the effects of possible noise interference. Additionally, it is desirable to provide an efficient implementation of the method which facilitates the use of specialized hardware for real time data processing.

SUMMARY OF THE INVENTION

Accordingly, it is an object of the present invention to provide a system and method for topologically correct surface rendering of internal structures within a volume of interest.

It is another object of the present invention to provide a system and method for the display of three-dimensional information.

It is also an object of the present invention to provide a system and method which can be implemented in specialized electronic hardware.

It is another object of the present invention to provide a graphics imaging system capable of being interactively used, and providing high quality images with textural shading and other visual clues to the user.

It is yet another object of the present invention to provide medical practitioners with the abilities to emulate surgical procedures graphically prior to undertaking invasive patient treatments.

Additionally, it is an object of the present invention to provide a plurality of three-dimensional surface views from a single set of collected data.

A further object of the present invention is to provide a system for analysis of internal structures within a 3D solid body.

Lastly, but not exclusively it is an object of the present invention to minimize the effects of possible noise interference.

In accordance with a preferred embodiment of the present invention, a novel method for rendering three-dimensional surface structures comprises the following steps. Signal patterns representing the value of at least one physical property associated with regularly spaced grid locations in a three dimensional body are stored in a memory means. The regularly spaced grid locations define voxel elements within the body, such that each voxel is associated with eight vertex values and six voxel faces. The signal patterns that represent values lying within a specified range associated with the surface structure of interest are next selected for further examination.

An initial grid location which corresponds to a position within or on the surface structure is first selected and the eight vertex values associated with a voxel at the initial grid location are selectively retrieved. A threshold value is supplied to determine which voxel vertex values are inside and which voxel vertex values are outside of the surface structure.

For each voxel face having at least one voxel vertex inside and at least one voxel vertex outside of the surface structure, there must be at least one pair of intersects between the edges of the voxel face and the surface structure. The coordinate values of these intersects between the voxel face and the surface structure are then computed. Preferably, the computation of these intersect coordinate values is done by a linear interpolation of the voxel vertex values. Other methods of computation can similarly be used.

A triangular approximation to the surface structure is then formed using the pair of intersects between the edges of the voxel face and the surface structure as two vertices of the triangle with a third vertex in the interior of the voxel. The step of forming triangles is repeated for each pair of voxel face intersects on the six faces of the voxel. The physical location of the third vertex of each triangle is identical and is computed as the centroid of all interpolated intersect coordinate values for the voxel.

The method further comprises the steps of identifying all adjacent voxels sharing a face intersect with the surface structure. Next, for each identified adjacent voxel, the steps of retrieving the eight vertex values, determining the inside and outside vertex values, computing the coordinates of the voxel face intersects and forming the triangles is repeatedly applied until all face-adjacent voxels within the three-dimensional body having a face intersect with the surface structure are processed. In the step of computing the intersect coordinates, only values that have not previously been computed are processed.

The proposed method of surface rendering further comprises the step of displaying a two-dimensional image of the approximated surface structure. Preferably, the surface structure is displayed by utilizing only the voxels identified by the processor as being crossed by the surface structure.

In a second preferred embodiment of the present invention, a method for generating of an internal surface structure within a three-dimensional body comprises the following steps. Three-dimensional signal patterns representing the value of at least one physical property associated with regularly spaced grid locations in a three dimensional body are stored in memory means. The regularly spaced grid locations define voxel elements within the body, such that each voxel is associated with vertex locations and voxel faces, each two intersecting voxel faces defining a voxel edge. Each voxel edge passes through two voxel vertices.

The signal patterns which represent values lying within a specified range associated with the surface structure of interest are next selected. Two voxel vertices of a voxel edge for one of said stored voxels are then retrieved; and it is determined which voxel vertex of the selected voxel edge is inside and which voxel vertex of the selected edge is outside of the surface structure.

For each selected voxel edge having at least one voxel vertex inside and at least one voxel vertex outside of the surface structure, a coordinate value of a first hit location where the surface structure crosses the voxel edge is next computed. Preferably, the computation of the intersect coordinate values is done by a linear interpolation of the voxel vertex values but other computation methods can be used as well.

Next, each of the two intersecting voxel faces that define the voxel edge where a hit was identified is examined for a second hit location which defines an intersect between the surface structure and the voxel face.

For each intersect of a voxel face with the surface of interest, a triangle with a vertex in the interior of the voxel is formed to obtain an approximation to the surface structure. The location of the third vertex of each approximating triangle is computed as the centroid of the voxel face intersects such that the voxel face intersects form a closed contour around the inside voxel vertex.

The method further comprises the steps of identifying all adjacent voxels that share a face intersect with the surface structure. Next, for each identified adjacent voxel, the steps of selectively retrieving two voxel vertices of a voxel edge, determining the inside and outside vertex values, computing coordinates of the first hit locations, examining the voxel faces defining the voxel edges, and forming the approximation triangles are repeatedly applied until all face-adjacent voxels within the three-dimensional body having a face intersect with the surface structure are processed. In the step of computing the intersect coordinates, only values that have not previously been computed are processed.

In accordance with the present invention, the method further comprises the step of displaying a two-dimensional image of the approximated surface structure. Preferably, the surface structure is displayed by utilizing only the voxels identified by the processor as being crossed by the surface structure.

In accordance with a preferred embodiment of the present invention, the proposed method for 3D surface rendering is implemented on a system for analysis and display of three-dimensional surface structures which comprises the following elements. First, storage means are provided for storing 3D signal patterns representing the value of at least one physical property associated with a 3D body at regularly spaced grid locations within the body. The signal patterns are provided by a three-dimensional raw data source, such as MRI, CAT, x-ray, ultrasound or others. A set of 3D-adjacent grid locations define a volume element referred to as voxel having associated with it voxel edges and voxel faces.

The system also comprises means for defining a plane of pixel positions having preselected values and corresponding to one plane of the spaced grid locations. Also provided is means for determining in the defined pixel plane, a pixel associated with a voxel that is intersected by a surface structure of interest within said body.

The system further comprises processing means for computing coordinate values of the intersection between the surface structure of interest and the intersected voxel edges and for computing the coordinate values of at least one articulating location positioned in the interior of the intersected voxel. Second storage means for storing the computed coordinate values along with connectivity information about joining the computed coordinate values into a set of triangles is also provided. These triangles approximate the intersection between the surface structure of interest and the voxel. Each triangle has one edge on a voxel face and one vertex at an articulating location in the interior of the intersected voxel. Preferably, the processor means further comprises generating means for generating normal vectors associated with the computed coordinate values. The computed normal vectors are similarly stored in the second storage means.

In a preferred embodiment of the present invention, the processing means of the system further comprises means for identifying which of the voxels sharing a voxel face with the intersected voxel are intersected by the surface structure of interest. To provide for a better data management of the system, the processing means further comprises means for generating, for each voxel that is intersected, a plurality of index values representing information about the shared voxel face intersects. These index values are also stored in the second storage means and are used to indicate to the processor which voxels and voxel faces have been processed.

The processing means of the system comprises means for simultaneously comparing all vertex values of an intersected voxel to a threshold value. This comparison is done independently for each voxel face thus enabling a parallelizable, high speed implementation of the proposed system.

In order to facilitate the display of the 3D surface structure of interest, the system of the present invention further comprises display processor means which receives data from the second storage means and converts it into a display format. The display format data is supplied to means for interactively displaying surface structures of interest.

In accordance with another embodiment of the present invention, the planar arrangement of the regularly spaced grid-locations is other than a rectangular array. For example, the planar arrangement of the grid locations may have a hexagonal, or other pattern suitable for processing shape.

The system and method for surface rendering and display of the present invention have a number of practical applications. For example, the internal data structure representation allows the user to simultaneously process and display two or more isosurfaces. As a result, the system provides a mechanism to count 3D disjoint structures within the interior of a body under study by enumerating the independent structures being processed.

The system and method of the present invention can in addition be used to compute and display crosssections of disjoint surface structures. Such surface structures need not only be internal structures of the object under study. While the description of the proposed method is presented in terms of the measured values of a given physical property of the object, other types of surfaces can similarly be computed and displayed. For instance, this can include isogradient and isocurvature surfaces giving information about the locations within the body having identical rate of change in the density values or curvature values, respectively. The cross-section of such surfaces with the structure surface can be used to automatically compute cardinal landmarks on the object surface.

In a different application, the system of the present invention can be used to compute global structure parameters such as the total surface area, and the structure volume. Information necessary to compute these quantities, including the coordinates of a set of physical points which belong to the surface is stored and available for each processed structure. The resulting parameter estimates can be used to define characteristics of the object under study, such as volume occupancy, average structure size and others, which characteristics have a wide range of applications, especially in 3D pattern classification.

Lastly, but not exclusively, the system of the present invention can be used to observe time changes in the interior structures of a given solid object by knitting together "snap-shots" of the surface of the structure and displaying these snap-shots in a sequence. An exemplary application of such system use is the monitoring of a patient's heart beat pattern.

BRIEF DESCRIPTION OF THE DRAWINGS

These and other advantages, features and objects of the present invention are described in the following description of the preferred embodiment in which:

FIG. 8 shows ambiguity in voxel face contour lines.

FIG. 10 illustrates spinning approximation triangles using an articulation point.

FIG. 12 is a flow-chart of the SpiderWeb B method.

DETAILED DESCRIPTION OF THE INVENTION

Figure 1:
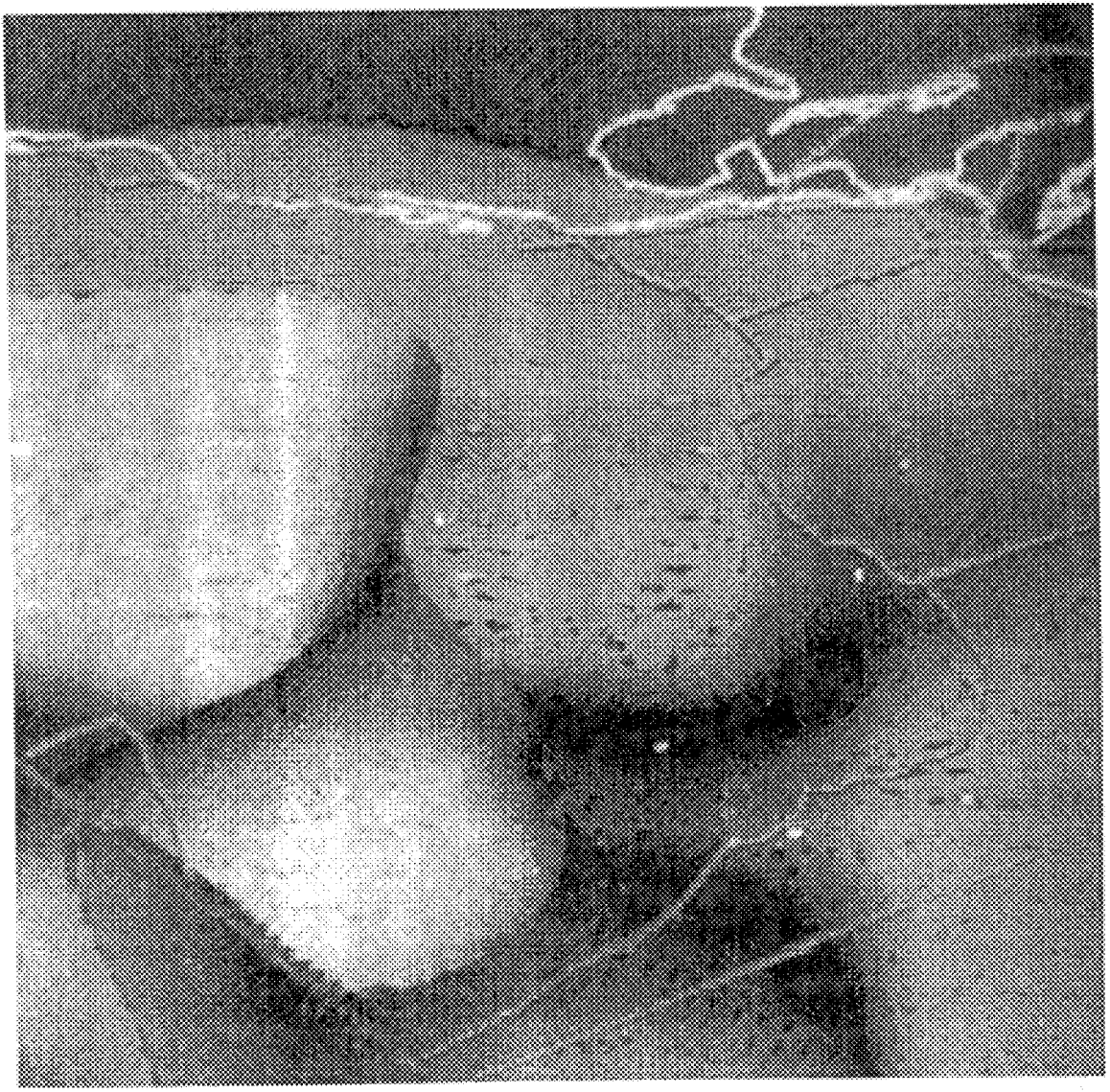
FIG. 1 is a detail of surface tiling errors in a prior art surface rendering method.

Referring now to FIG. 1 a surface detail is shown which illustrates tiling errors in a prior art surface rendering method. The errors are observed as bright or very dark spots on the surface, indicating a tear in the represented surface or a missing approximation tile. The present invention is designed to remove such errors by presenting a topologically consistent method of building a triangularization grid which represents an arbitrary three-dimensional structure.

Illustratively, the invention is practiced on the raw data obtained from non-intrusive measurements of at least one physical property within a planar slice through a body under study. A typical source of the raw data is an MRI or CT system, an x-ray, ultrasound or another type of a scanner, capable of converting measurements of some physical property of the body, at regular grid-like locations within the planar slice, into an array of discrete values. Other non-intrusive data collection mechanisms such as positron emission tomography (PET), emission computer tomography (ECT) and multimodality imaging (MMI) systems can also be used as a data source.

The operation of the data source may be carried out for a sequence of slices of the solid object, thus providing a three-dimensional array of values representative of the spatial structure of the object. Alternatively, it is possible to collect data over various periods of time, for the purpose of measuring temporal changes in the body under study.

The raw data is stored in a first storage means, preferably indexed by a slice number. The storage means preferably has a fast access time and may comprise magnetic storage, random access memory or other known in the art storage media. Advantageously, the storage means also comprises means for converting the raw data into an application specific internal data structure, in order to take advantage of the specific hardware configuration used. For example, the internal data structure provides the capability of individually addressing and retrieving individual pixel elements as well as sets of spatially adjacent pixel configurations, referred to as voxels.

In accordance with a preferred embodiment of the present invention, the first storage means also provides the capability of indexing each vertex, each voxel edge and voxel face, in order to facilitate the computation process.

Figure 4:
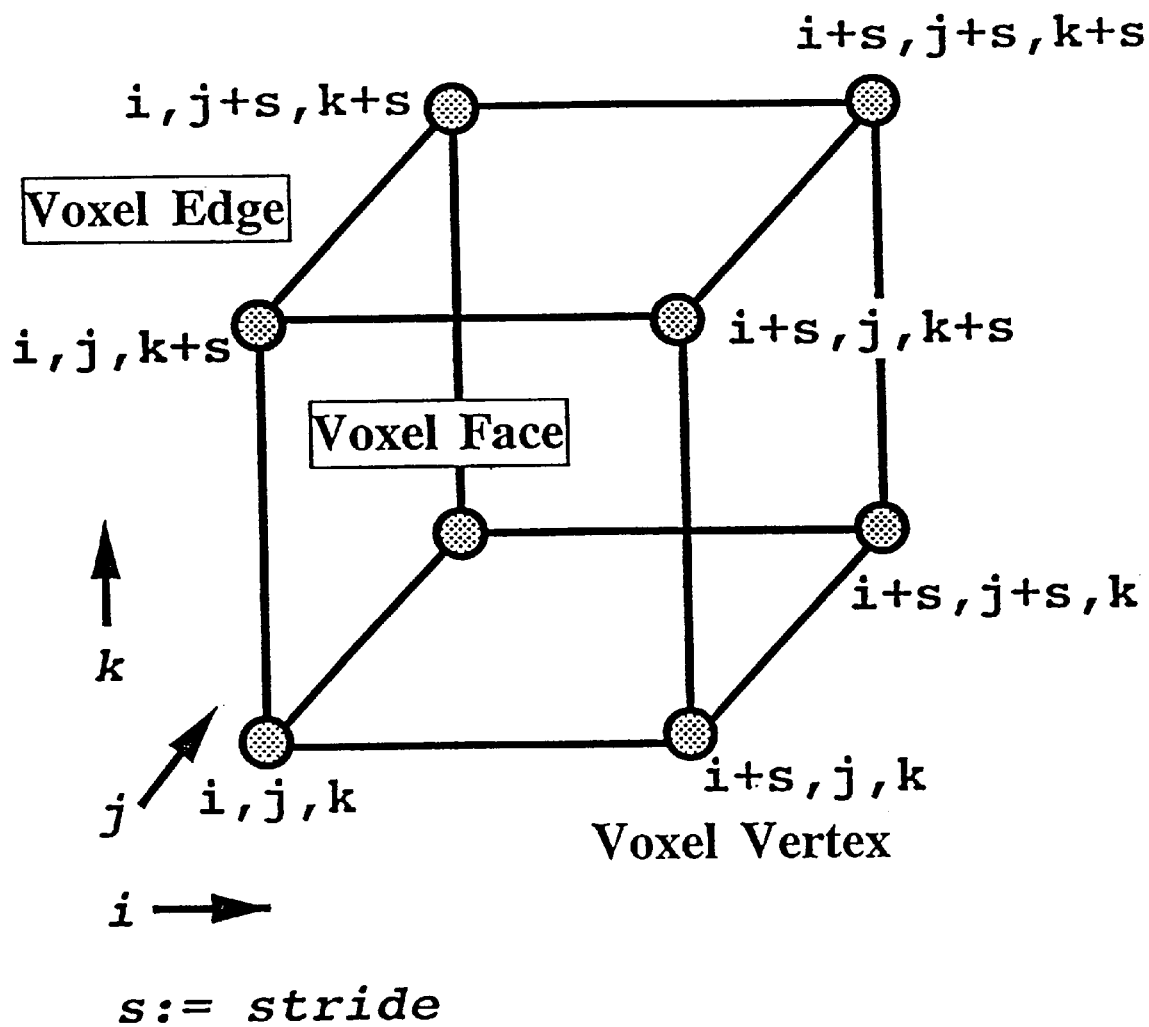
FIG. 4 is a three dimensional voxel with elements defined.
Figure 5A:
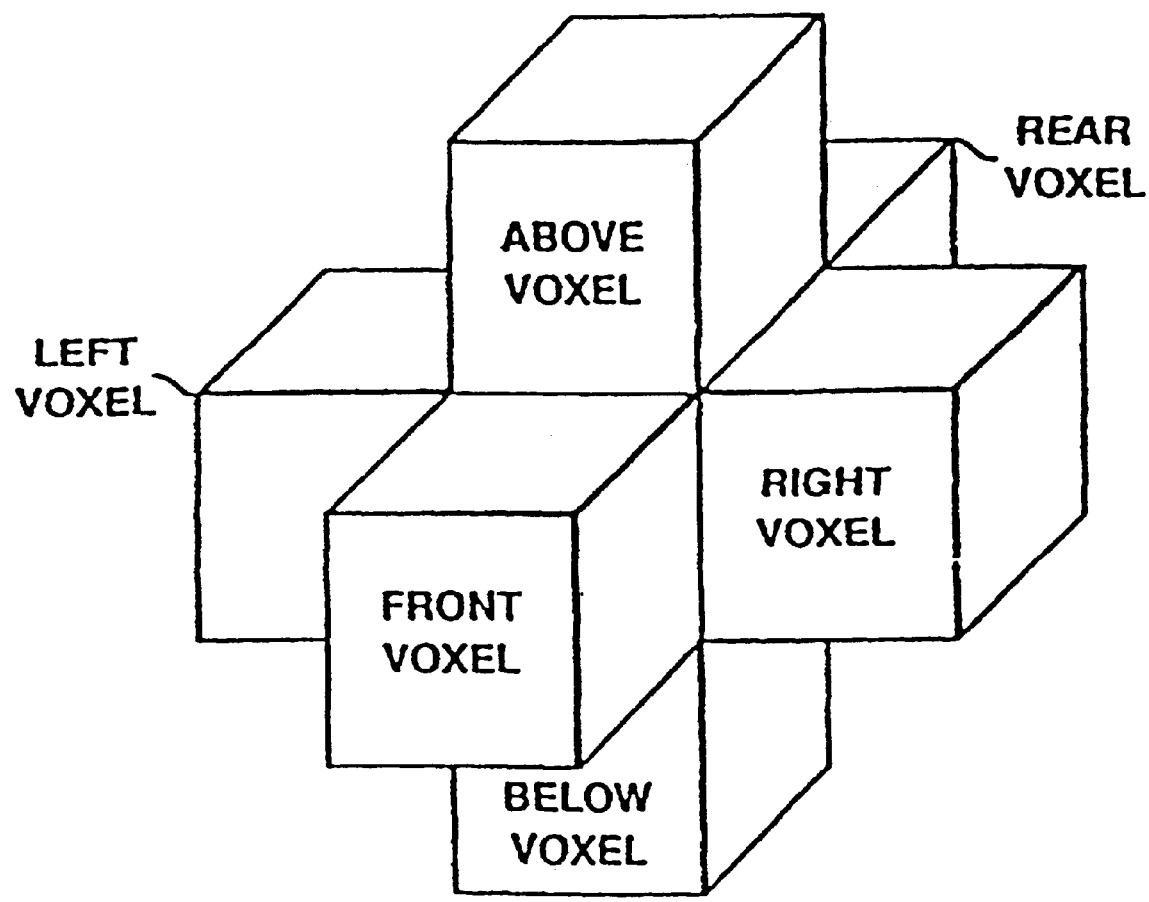
FIGS. 5(A) and (B) are perspective views of a voxel neighborhood and voxel adjacencies for three dimensional voxel elements, respectively.
Figure 5B:
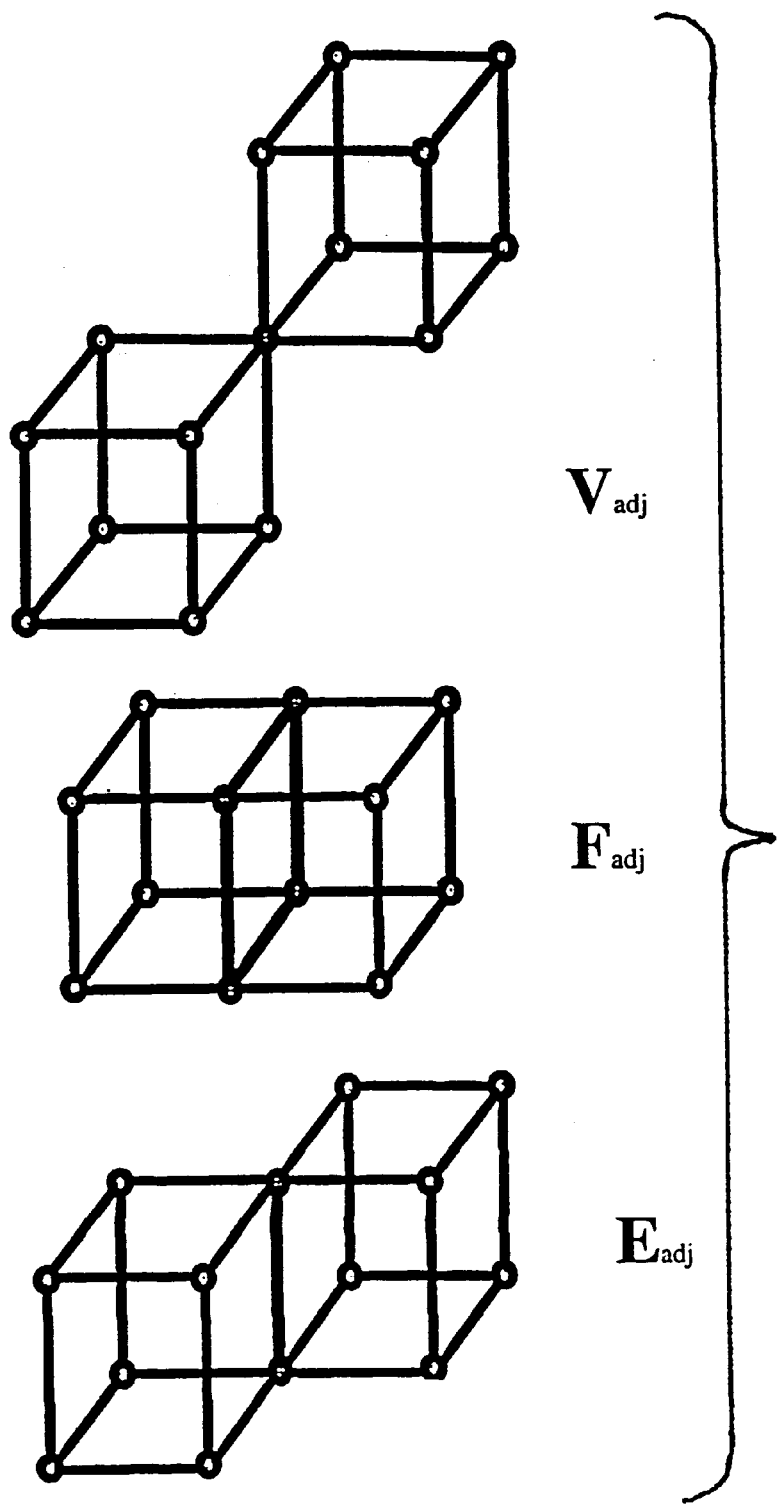
Figure 6:
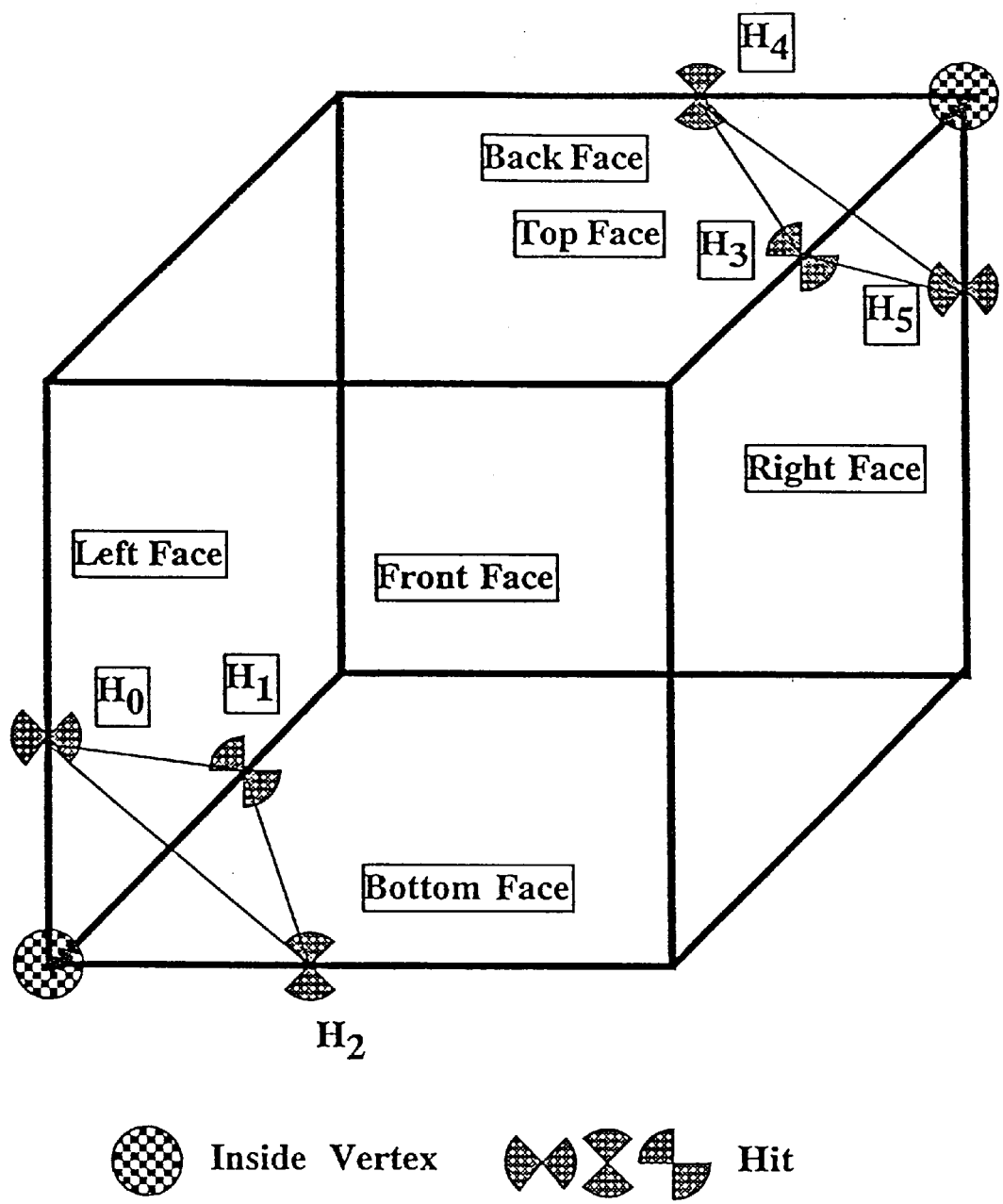
FIG. 6 shows intersection of a voxel by surface structures.

The indexing of the voxels will be better understood from FIGS. 4–6. FIG. 4 shows a voxel element consisting of a cubic arrangement of eight data pixels and presents element definitions consistently used in the following description. Each pixel element is associated with a triplet of indexes (i,j,k) used to determine the location of the pixel in a three-dimensional indexing system. By convention, the lower left vertex of the front face is selected as a reference point. The indexes of the adjacent pixels to the left, to the top and towards the back plane are shown to increase by the length s, which corresponds to the number of display pixels inscribed within two consecutive data points.

It is to be understood that FIG. 4 only serves as an illustration and other possible conventions are possible, as long as they consistently applied. Thus, a different vertex of a voxel element may be selected as a reference point, and the direction of index increase may be selected opposite to the one shown in FIG. 4. Furthermore, the length s may correspond to substantially different physical distances depending on the particular application. In addition, even though in FIG. 4 the length is identically labeled in all three index directions, in practice this may not necessarily hold true. The reason is that the data sampling step in each coordinate direction depends on the corresponding spatial resolution of the raw data source in the specific index direction.

In accordance with the present invention, voxel elements, such as the vertices, edges and voxel faces, illustrated in FIG. 4, can be referenced by a data processor in groups or individually. Label information is associated with each voxel element, so that vertex values connected along edges of the voxel, or voxel faces are marked as being connected. Similarly, other data structures which are used in a group during the processing are marked as being connected. A second storage means associated with the data processor comprises a memory which is allocated for each data structure, so that the processor is capable of determining whether or not a particular element of the data structure has been previously processed. For instance, each time a specific voxel edge is retrieved, a mark is left indicating for all associated data structures that this element has been processed. Thus, when the next element of a connected data structure is visited, the processor need not revisit the original voxel edge.

FIG. 5(A) is a perspective view of a voxel neighborhood. FIG. 5(B) depicts possible combinations for voxel pairs, which define a vertex adjacency, an edge adjacency and a face adjacency, depending on whether only a vertex, an edge or a voxel face, respectively, are shared.

In reference to FIG. 6, a voxel element is shown intersected by two separate isosurfaces. Voxel vertices, having values above an isosurface threshold are termed "inside" vertices, while voxel vertices having values less than the isosurface threshold are termed "outside" vertices. The intersection of an isosurface of interest with a voxel edge is referred to as a "hit". Six such hits, indicated as H0–H5 are shown in FIG. 6. The intersection between the surface of interest and a voxel face is referred to as a "face intersect" and, as seen in FIG. 6, connects two voxel edge hits.

As previously noted, the first storage means comprises means for converting the raw data into a specific internal data structure, which allows all voxel elements of the data array to be consistently indexed by the data processor for identification purposes. For example, the face intersect H0-H1 on the left face of the voxel in FIG. 6 is shared with the adjacent left voxel and, in fact, occupies the same physical location. By using a consistent indexing scheme, as well known in the computer graphics art, the data processor need only compute the hit locations once, and use their values when processing all corresponding edge adjacent voxels, as defined in FIG. 5(b).

In accordance with the present invention, the data processor implements a topologically consistent method of connecting the isosurface hits on voxel edges into a continuous triangularization grid representing the surface of interest for analysis and display. The method requires a starting point, or a "seed" pixel element on a data plane, selected by a plane selecting means. Using only local information about the adjacent pixels, the method "spins" a web of triangles, closely approximating the surface of interest. The processing sequence and visual appearance of the rendered surface resemble the construction of spider web, giving the process its "Spiderweb" name.

Figure 7:
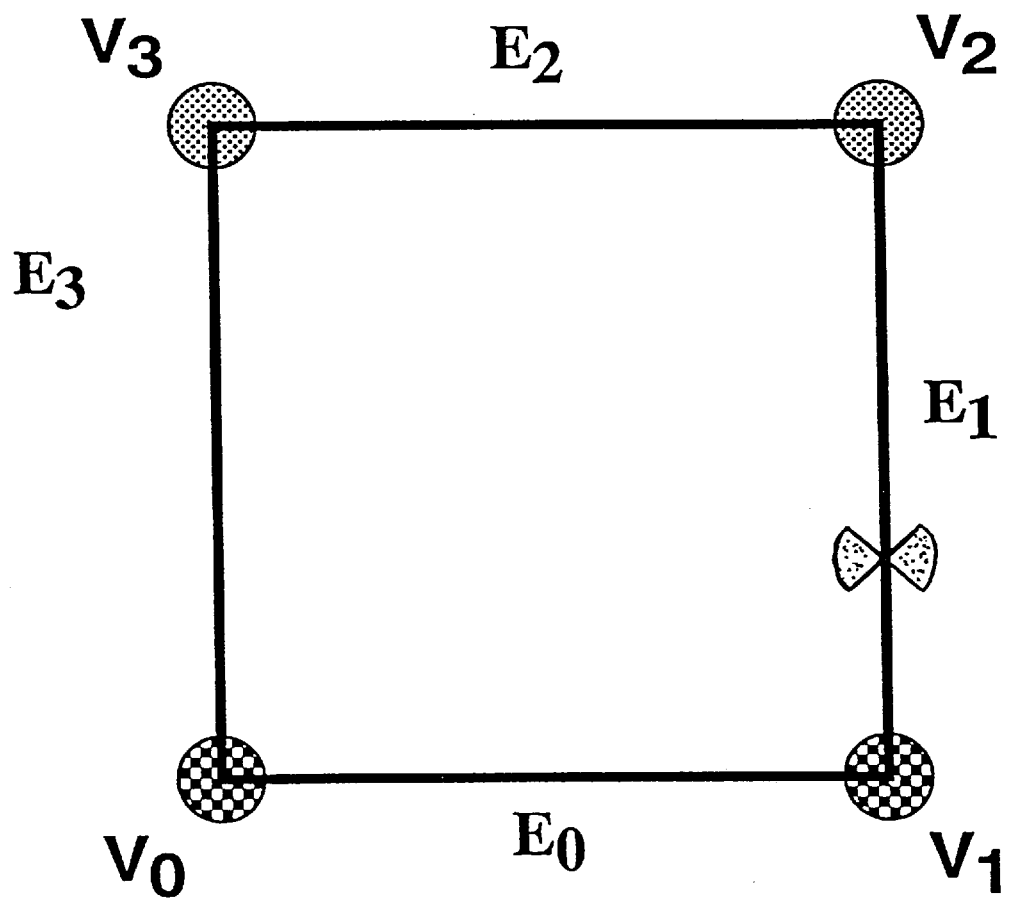
FIG. 7 illustrates voxel face hits assumptions.

Some assumptions about the topology of the approximated surfaces used in the surface rendering method of the present invention are illustrated in reference to FIGS. 7 and 8. In FIG. 7 depicts a voxel face with vertices V0–V3, edges E0–E3 and a clockwise scanning direction, as indicated by the arrow. A hit H1 is shown on voxel edge E1. In accordance with the present invention, it is first assumed that the crossing isosurface of interest is sufficiently smooth. This assumption imposes a limitation on the surface curvature.

Secondly, an isosurface is assumed to have no singularities, breaks, or holes, so that given a hit on one edge, there will be at least one more hit on the same voxel face. As a result of the these assumptions, in accordance with the present invention hits on a voxel face must come in pairs. Referring back to FIG. 7, this implies that there must be at least one additional hit on the voxel face. If no such hit, or an odd number of hits is found, the processor will indicate an error.

FIG. 8 illustrates another possible situation, when all four edges of a voxel face have isosurface hits. As shown, this is only the case when diagonally opposite voxel vertices are both "inside," or both "outside" the surface of interest, and the two diagonal pairs are not on the same side of the surface. Lacking global information about the isosurfaces, the exact direction of surface intersects cannot be determined. This ambiguity results in four possible cases of face intersects, indicated as cases A, B, C and D in FIG. 8. Cases B and D will be reconsidered in connection with the SpiderWeb A, and SpiderWeb B processing methods described next.

SpiderWeb A

Figure 9:
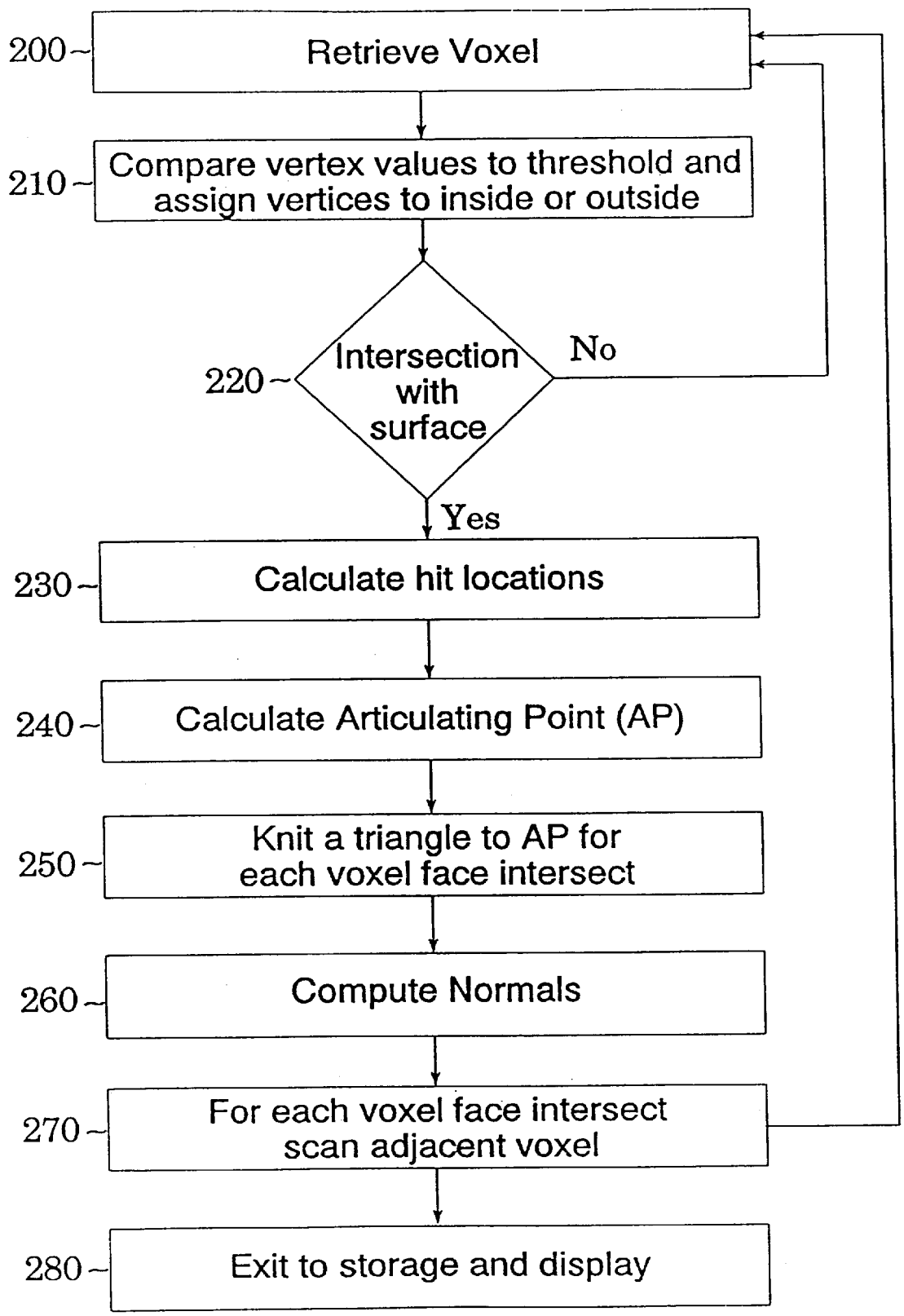
FIG. 9 is a flow-chart of the SpiderWeb A method.

FIG. 9 is a flow-chart of a first embodiment of the surface rendering method in accordance with the present invention, referred to as SpiderWeb A. In this method, no decision about the exact direction of the face intersects in the case of four hits is made. This corresponds to case D in FIG. 8, where the four hits are connected, thus minimizing the probability is that an error is made. The algorithmic steps in this case are as follows.

In step 200 of the method, the pixel elements corresponding to one voxel are simultaneously retrieved from the data storage. The vertex elements of the voxel are next compared in step 210 to a preselected threshold which corresponds to the surface of interest, and each vertex is assigned as either inside or outside with respect to the surface.

If an intersection of the surface with the voxel is not detected, the method proceeds to retrieve a face adjacent voxel in accordance with predefined voxel sequencing rules. If a surface intersection is detected at step 220, the locations of all edge hits of the voxel, which have not been previously processed, are computed. Preferably, the position of a hit along an edge is computed by using a linear interpolation of the values at the two vertices defining the edge. For example, if a voxel edge with a hit has an outside vertex at position $V_{x0}$, with a value of $V_0$, and an inside vertex at position $V_{x1}$ with a value of $V_1$, and the threshold value is $\tau$, so that $V_0 < \tau < V_1$, the location of the edge hit Ex can be calculated using the formula:

$$Ex = V_{x0} + (V_{x1} - V_{x0})(\tau - V_0)/(V_1 - V_0)$$

Naturally, other methods of estimating the position of the hit, such as non-linear interpolation, may be used, as is well known in the art.

The next step 240 involves the calculation of an Articulating Point (AP) which is located entirely in the interior of the voxel. The articulating point in the SpiderWeb A method is computed as the mean (centroid) of the system of all connected hits in a voxel.

The articulating point is used in the next step 250 as the third vertex of a set of surface approximation triangles, each triangle being defined by the articulating point and each of the possible different pairs of the connected hits in the voxel.

As can be appreciated by those skilled in the art, if only two edge hits are found for each voxel face, as for example shown in FIG. 6, the articulating point will lie on the plane defined by the hits; and the approximation triangles will be co-planar. An illustration of the SpiderWeb A two-face-hits approximation surface is shown in FIG. 10 where the articulating point is located near the center of the voxel at the centroid of the four hits and four approximation triangles are defined, each with the articulating point as one vertex and with two connected hits on one of the four faces as the other two vertices.

Figure 11:
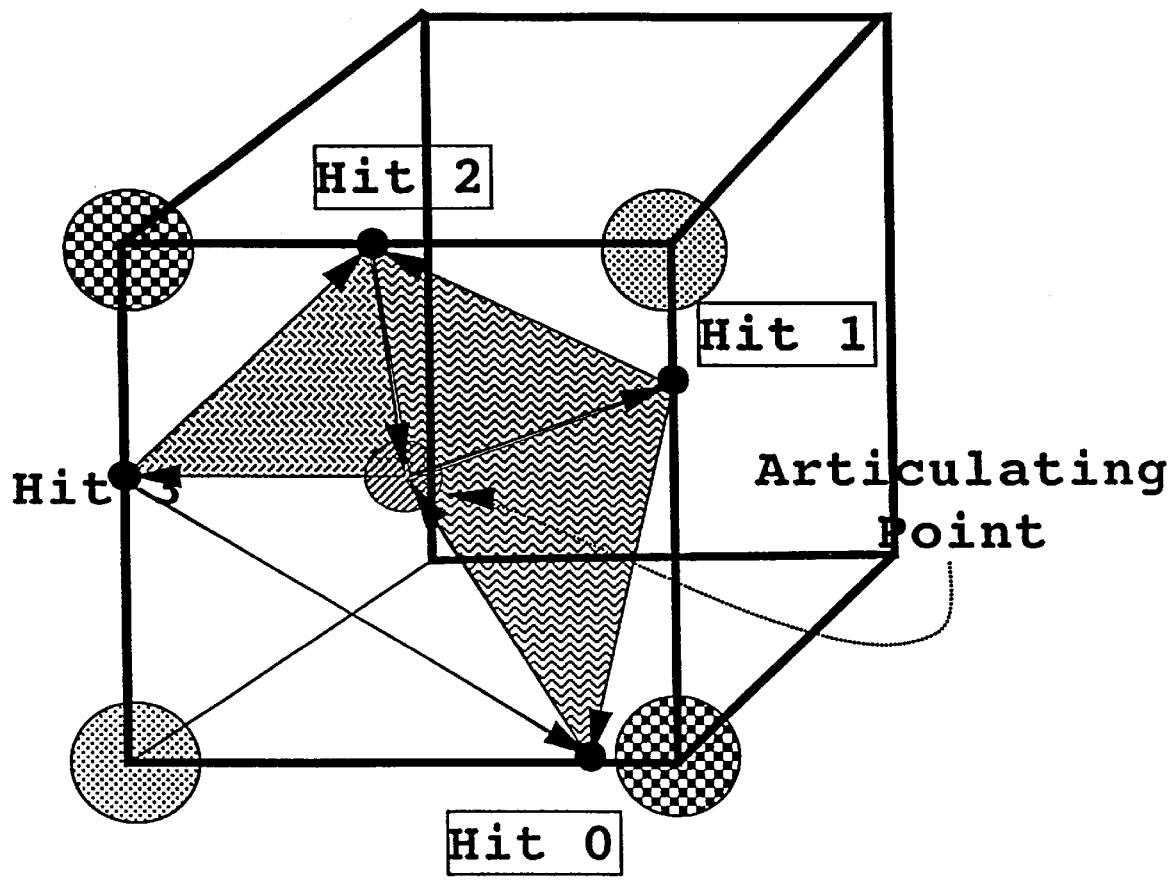
FIG. 11 illustrates spinning approximation triangles for a voxel face contour ambiguity using SpiderWeb A.

If, on the other hand, four hits are encountered in a voxel face, the resulting approximation surface triangles will form a pyramid, touching at its tip (the AP) another approximation surface. An example is shown in FIG. 11.

In step 260 of the method, triangle and vertex normals for each of the approximation triangles are computed. The purpose of these normals will be discussed in more detail below in connection with the description of display processor 70 of the system of FIG. 2.

In the following step 270, for each intersected voxel face, the face adjacent voxel is retrieved and processed. In accordance with the present invention, the indices of all voxel faces that have already been processed are marked so that processed voxel faces need not be considered again.

Finally, data from the SpiderWeb processor is forwarded to storage and display at step 270.

SpiderWeb A processing method has the disadvantage of creating "tunnel" voxels and "bubbles" in the case of a voxel face ambiguity. However, in the case of a noisy data, this property may actually reduce the visual impact of the noise, since its effect is localized to a particular voxel element and is not visible to the user.

SpiderWeb B

FIG. 12 is a flow-chart of the second embodiment of the surface rendering method in accordance with the present invention, referred to as SpiderWeb B. In this method, a consistent decision is made about the exact direction of the face intersects in the case of four hits on a voxel face. The decision corresponds to case B in FIG. 8, where the four edge hits are connected in a way so as to surround the inside voxel vertex. The algorithmic steps in this case are as follows.

In step 300 of the method, a starting or seed vertex is selected. In the next step 310, the three edges associated with the seed vertex are scanned so as to retrieve the vertex elements at the opposite ends of those edges, and in the following step 320 those vertex elements are compared to the pre-selected threshold. The hit locations are calculated by means of a linear interpolation, as discussed above, or estimated in any other suitable manner, as known in the art.

Triangles are formed in SpiderWeb B in the following four steps which are performed for each edge that is hit. First, in step 340, the two voxel faces that define the edge that has been hit are scanned for additional hits. This is done beginning with the inside vertex of the edge that has been hit and proceeding from vertex to vertex around the edges of the first voxel face and then around the edges of the second voxel face. Hit locations are calculated by linear interpolation as discussed above. Since face intersects on a voxel face occur in pairs, the scanning of each face stops when the first additional hit is located. The processor then forms a triangle having one vertex at the intersection point on the edge that was originally hit, a second vertex at the location of the first additional hit and a third vertex at an articulating point with an initially undetermined physical location inside the voxel.

If the foregoing procedure identifies any single hits on another face of the voxel, that face is likewise scanned to locate the second hit; and the two hits on that face and an articulating point at an undefined location within the voxel constitute another surface approximation triangle. If a pair of hits are identified on another face of the voxel, these hits and an articulating point likewise constitute another surface approximation triangle. This process continues until all surfaces of the voxel are accounted for. The exact location of the articulating point for all triangles of the voxel is then computed as the centroid of all edge hits, and information about the triangles is stored. Triangle and vertex normals, to be discussed next, are computed at step 370.

For each voxel edge with a surface hit, the process repeats itself in the face adjacent voxels. In particular, in step 380 a set of edges from the face adjacent voxel is examined until all possible intersections of the isosurface of interest are processed. Finally, in step 390 the processor exits to storage means 60 and the display processor 70.

Unlike the SpiderWeb A method, this embodiment of the present invention does not necessarily involve simultaneous processing of entire voxels. Instead, after the initial seed pixel is specified, the proposed method tracks along the isosurface of interest in accordance with the adopted indexing scheme, only visiting voxel edges and faces with hits.

Figure 13:
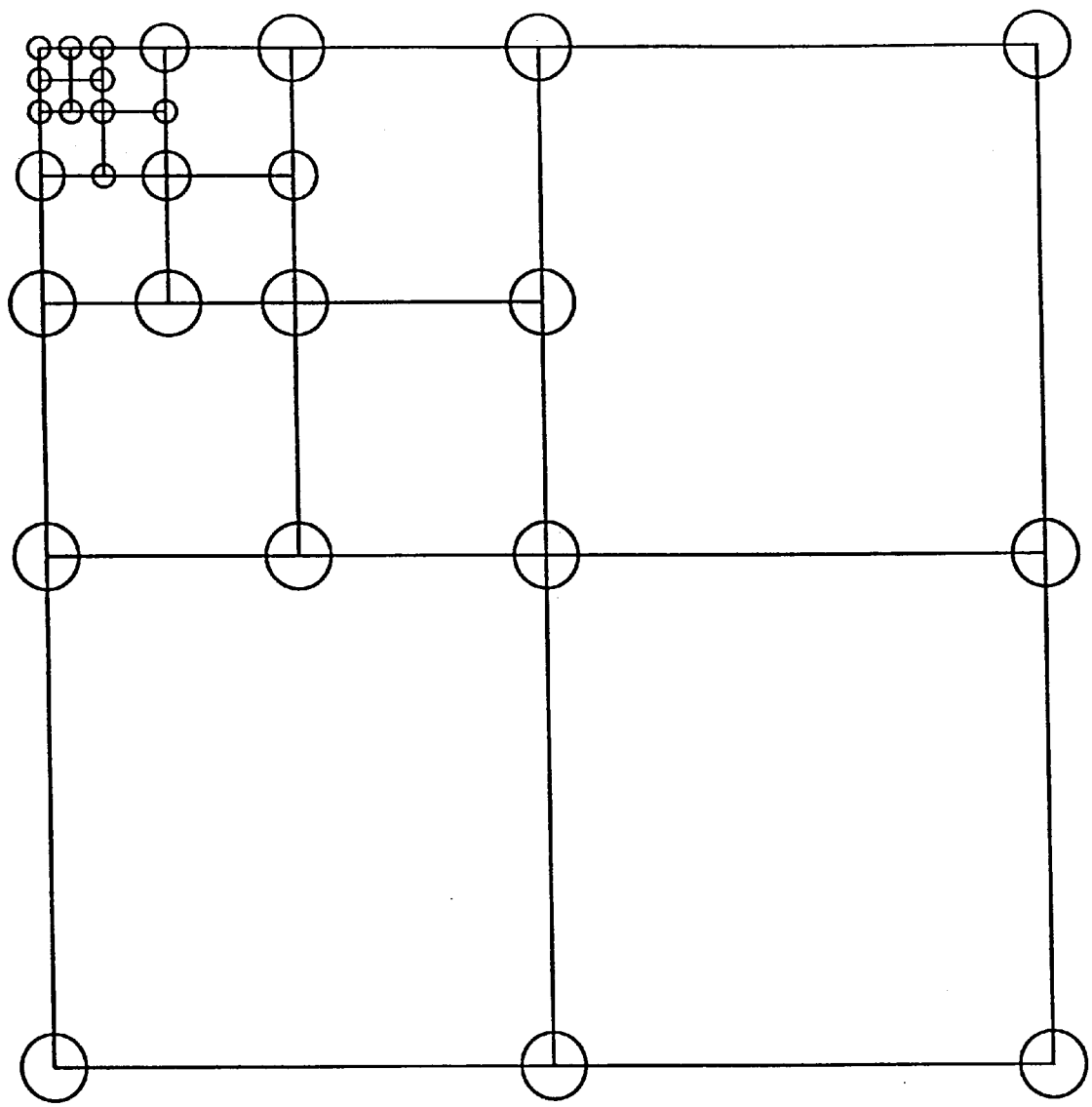
FIG. 13 shows a two-dimensional adaptive sampling grid.
Figure 14:
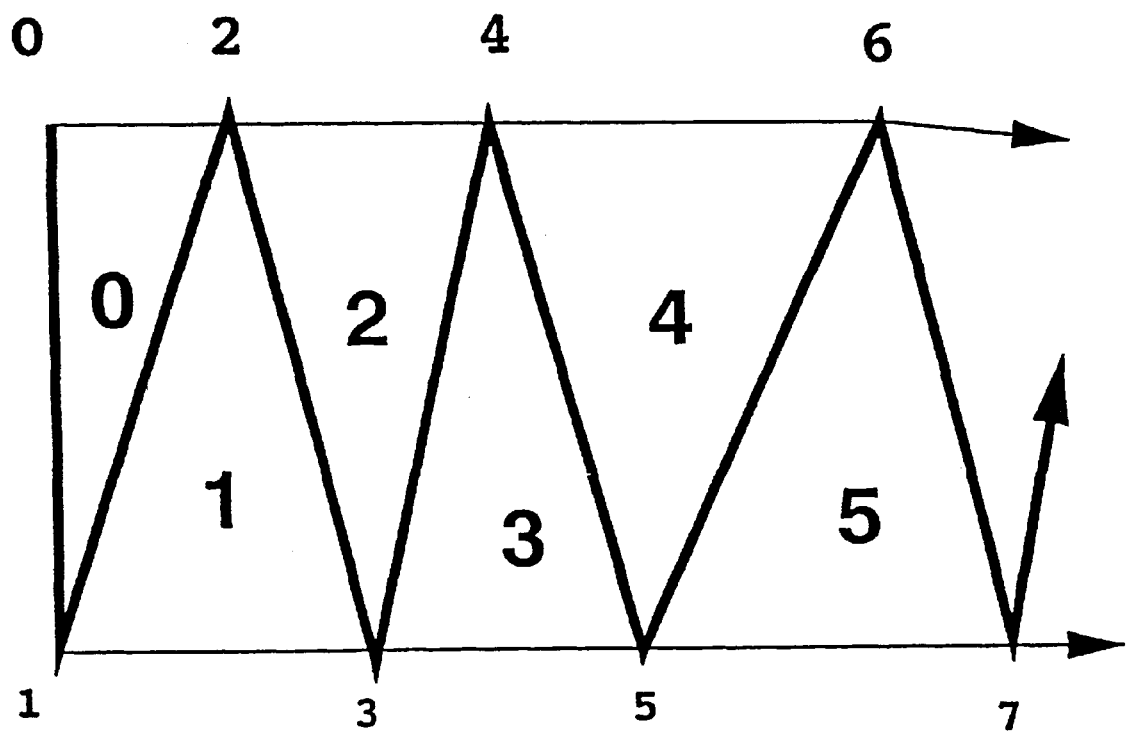
FIG. 14 shows triangle vertices drawn in a T-mesh order.

Both SpiderWeb A and B processing methods reflect the uncertainty of the voxel face contour line ambiguity, illustrated in FIG. 8. In the embodiment of the present invention, using SpiderWeb A, no assumption is made about the exact direction of the face intersects, resulting in a three dimensional "bubble". In the second embodiment of the present invention, using SpiderWeb B, a systematic choice to "surround inside vertex" is made based on physical considerations. Yet another possibility to avoid the face intersect ambiguity is to increase the resolution of the space sampling grid until no voxel face has four hits per face. Thus, in accordance with another embodiment of the present invention the resolution of the sampling grid is adaptively refined. FIG. 13 shows a two-dimensional adaptive sampling in which the upper left corner is illustratively subdivided until adequate resolution is achieved.

The rectangular array of sampling elements considered thus far is only illustrative of the different sampling grids which can be used in accordance with the present invention. Well known in the literature is for instance the two-dimensional hexagonal sampling grid that can reduce the number of required samples in a plane by about 13.4% (see, for example Dudgeon et al., "Multidimensional Digital Signal Processing," 1984, pg. 39–47). Other sampling grids can also be used, as known in the art.

It is important to note that while the processor computes a large number of triangles, information for which needs to be stored, the actual computation process can be significantly sped up due to the fact that separate voxel faces can be processed independently. Thus, the proposed method can be implemented in a parallel architecture resulting in a significant improvement in terms of processing speed.

Figure 2:
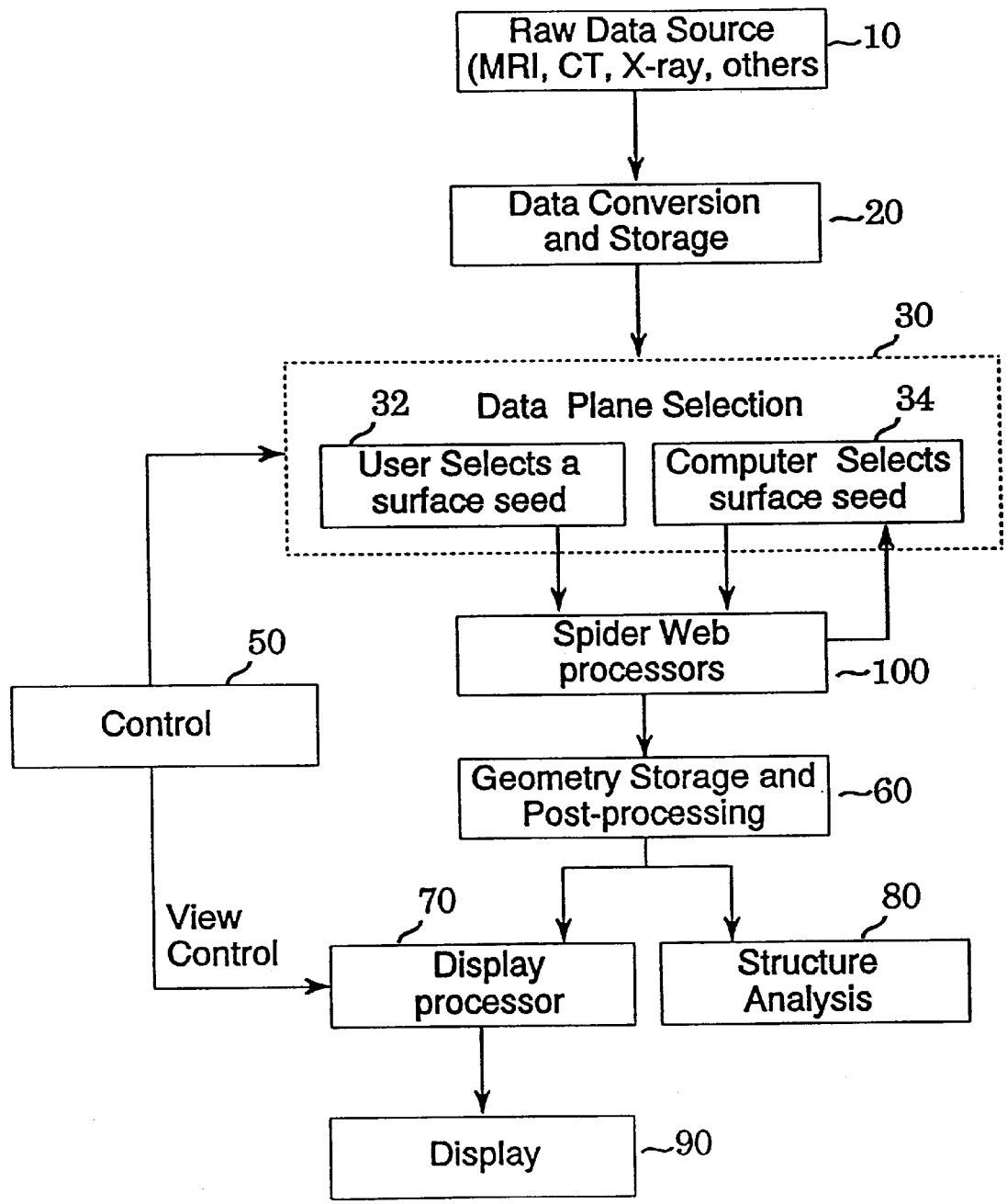
FIG. 2 is a block-diagram of a system for carrying out the method of the present invention.

As shown in FIG. 2, illustrative apparatus for the practice of the invention comprises a first storage means 20, a plane selection means 30, control unit 50, a Spiderweb processor 100, a second storage means 60, a display processor 70 and a structure analysis means 80.

Plane selection means 30 operates under the control of an operator from control unit 50 to select data from individual data planes stored in data storage 20. The operator may preview data planes corresponding to a particular physical location of interest in the body under study. Since structures having different physical properties exhibit different ranges of measured values, the operator can isolate a specific structure of interest by selecting a particular threshold or a range of threshold values. For example, the operator could isolate bones from the surrounding soft tissue in medical imaging.

Figure 3:
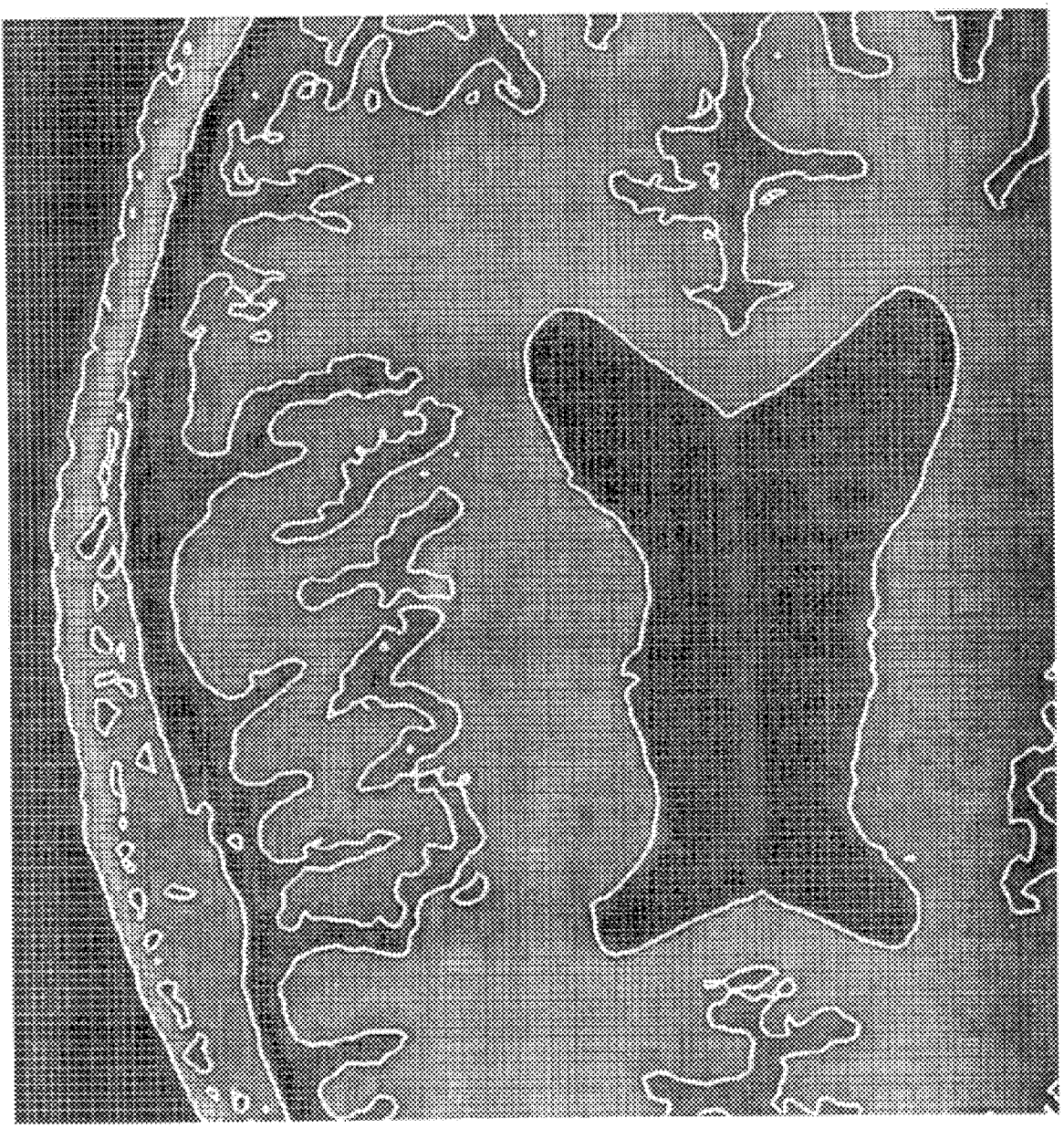
FIG. 3 is an isocontour plot of an MRI axial slice of a brain used for plane selection preview.

FIG. 3 illustrates an isocontour plot of an MRI axial slice of the brain used for a plane selection preview in accordance with a preferred embodiment of the present invention. In this embodiment, using selection means 32 in FIG. 2, the operator can choose a specific plane of interest and display it on a monitor. A preselect threshold value is supplied to display processor 70 and is used to display the locations (the contour lines) at which the selected data plane is crossed by a surface structure having the same physical property value. The operator can then identify a particular contour line and specify the coordinates of a desired starting point ("seed"). The coordinates of the seed are next supplied to processor 100 to initiate the rendering of the desired surface structure. If no contour line of the surface of interest is identified, the operator can interactively specify a different data plane or modify the threshold value until a desirable contour is found and a seed element selected.

In an alternative embodiment of the present invention, the selection of a starting point to render an internal surface of interest can be done using computer selection means 34. In this embodiment, a threshold value supplied by the operator is used in sequentially scanning the data array for elements that cross the threshold value. The first pixel having the same value as the threshold value corresponding to the surface of interest is selected as a starting point and its memory address is passed to processor 100 which generates an internal surface of interest. After completing the given surface, as indicated by absence of face-adjacent voxels that share a face intersect with voxels being intersected by the surface, processor 100 sends a signal back to selection means 34 prompting for selection of the next starting point. Since all voxels visited by the processor 100 are "flagged" to indicate that they have been processed, selection means 34 only identifies the next unprocessed starting point on a surface of interest. Its address is passed to the processor for rendering the next surface structure. The process continues until no voxel within the stored data array having a vertex value corresponding to the desired threshold is left without being flagged as processed. This provides an indication that all disjoined surfaces that satisfy the threshold conditions have been processed.

Storage means 60 is used by the SpiderWeb processor to store data about the interconnection structure of the processed isosurface. In accordance with the processing method, this may include information about the visited voxel vertices, edges and faces, as well as the computed locations of edge hits and articulating points, and information about the interconnection of different elements into individually addressable data structures, such as the approximation triangles spun from each face intersect. Also stored in storage means 60 are the so-called shared normal vectors associated with the articulating points and voxel edge hit locations. The shared normal vectors are computed in processor 100 as the average of the set of unit normal vectors for each triangle having a vertex at the respective hit or articulating point.

The display of the generated approximation surfaces is an important element of the proposed invention. While both SpiderWeb A and B methods in general exhibit insensitivity to noisy data which is results in a better display, they both generate a large number of triangles, thereby increasing the computational burden of the system. In a number of cases, as discussed earlier, such triangles are in fact co-planar and in principle need not be processed separately. The specific data structure used in the methods may, however, be used to significantly reduce the computational burden at the display stage.

Reference is now made to FIG. 13 in which a "T-mesh" ordering of approximation surface triangles is shown. The T-mesh run illustrated in the figure is a contiguous strip of triangles, ordered in a "zig-zag" fashion. A set of three initial triangle vertices, labeled 0, 1, 2 is first drawn. After the last triangle vertex 2 is specified, the triangle 0 is drawn, using the connecting edges between vertices as delimiters. Since the edge (1–2) is shared by triangles 0 and 1, when rendering the latter triangle, one need only specify one more point (vertex 3). Thus, after vertex 3 is specified, triangle 1 can be drawn. In the next step, vertex 4 builds triangle 2, by only specifying one additional point. The process continues, until all triangles of the T-mesh run are drawn. At each step only one additional triangle vertex is specified and the display processor never needs to draw an edge twice.

The SpiderWeb method of surface rendering results in a data structure especially suitable for display using the T-run approach illustrated in FIG. 13. Since information about the shared triangle edges is already processed and stored, the appropriate T-mesh sequence can correspondingly be defined by traversing voxel faces and considering rows of triangles as a group. A Silicon Graphics VGX or VTX hardware can be used to draw surfaces at the rate of more than $1.6 \times 10^6$ T-mesh triangles per second.

Figure 15:
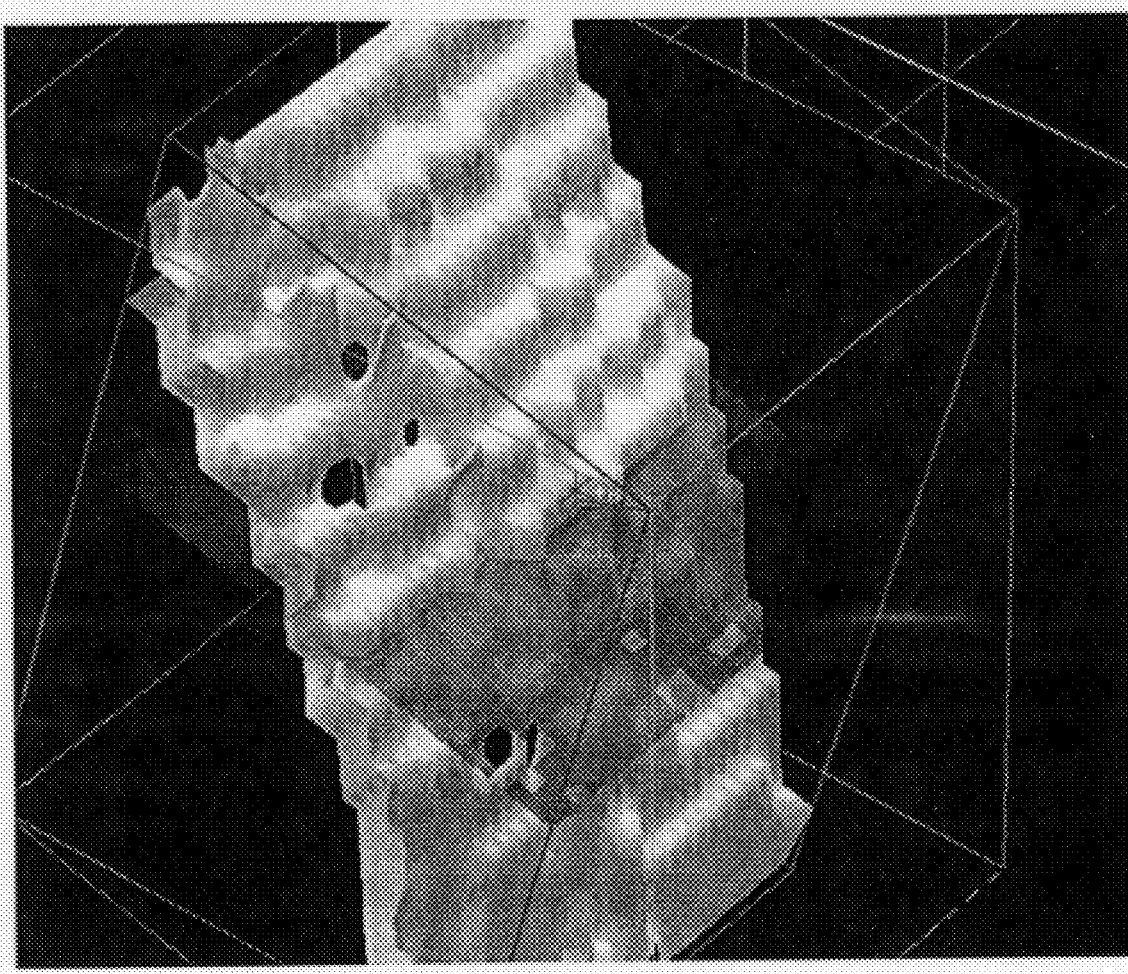
FIG. 15 is an approximating surface computed with full precision.
Figure 16:
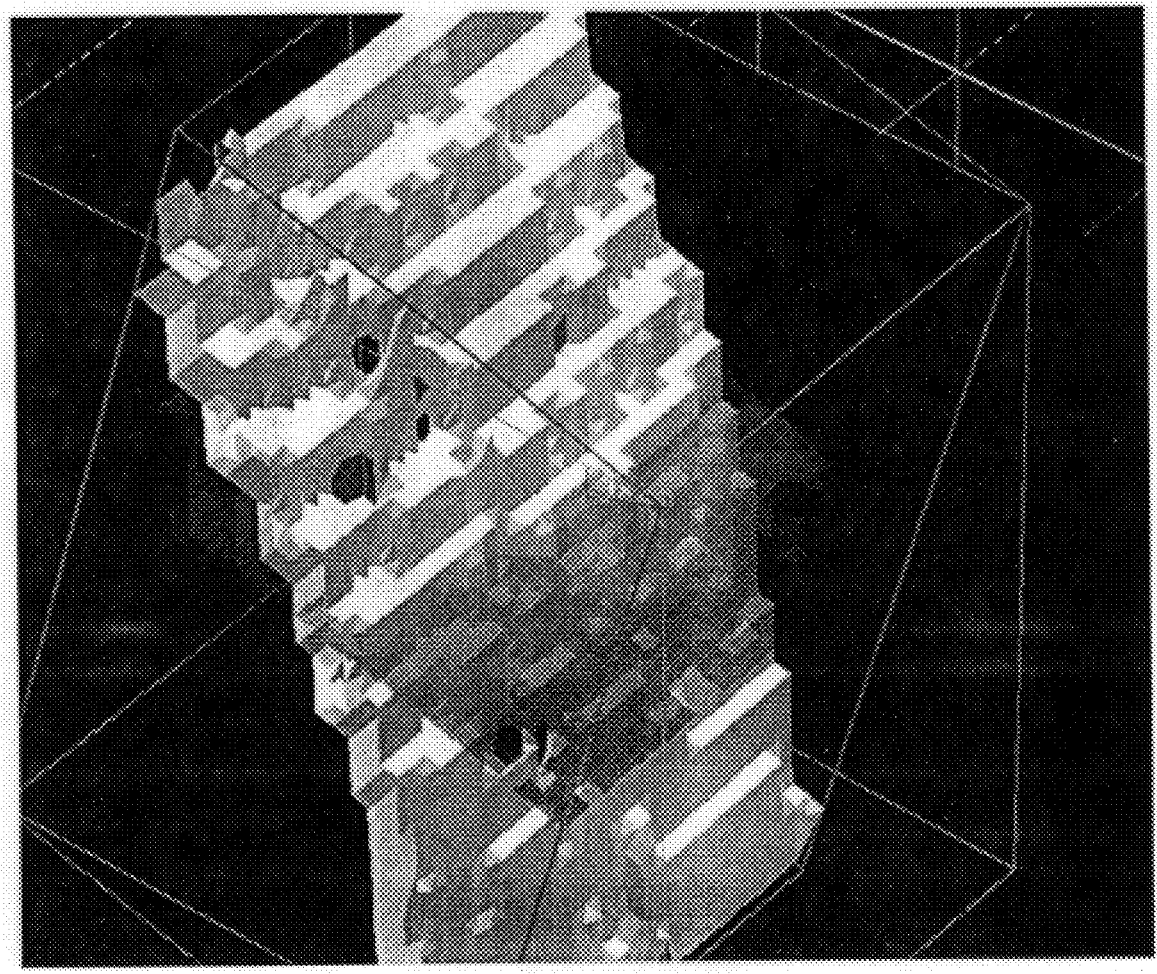
FIG. 16 shows the approximating surface of FIG. 16 using midway hit location speed processing.

In order to further reduce the computational requirements of the SpiderWeb method it is possible to simplify the computation of the edge hit locations. For example, if an edge has a hit, instead of calculating its location exactly, in one embodiment of the present invention the hit location is taken to a standard position (a preferred choice is midway between the edge vertices). The independent angles between surface triangles are thus reduced to a relatively small number of cases, which simplifies the display at the expense of a somewhat "blocky" appearance of the surface. FIGS. 15 and 16 illustrate the difference between a fully processed, and a blocky approximation surfaces.

Referring again to FIG. 2, the output structure of the SpiderWeb processor 100 can be described as being in a vector form, as a sequence of triangle vertex points. In one embodiment of the present invention the data supplied to display processor 70 comprises a list of such vectors in three dimensions. The list also includes the shared normal vector, associated with each triangle vertex. Such normal vectors are computed at steps 260 and 370 in FIGS. 9 and 12, respectively. In a preferred embodiment of the present invention, a shaded, rasterized image is produced by the display processor 70 and supplied to display 90, in which each triangular tile is shaded on a scale, dependent on the relation between the viewing angle selected from the control 50 and the normal vector to the approximation tile.

Figure 17:
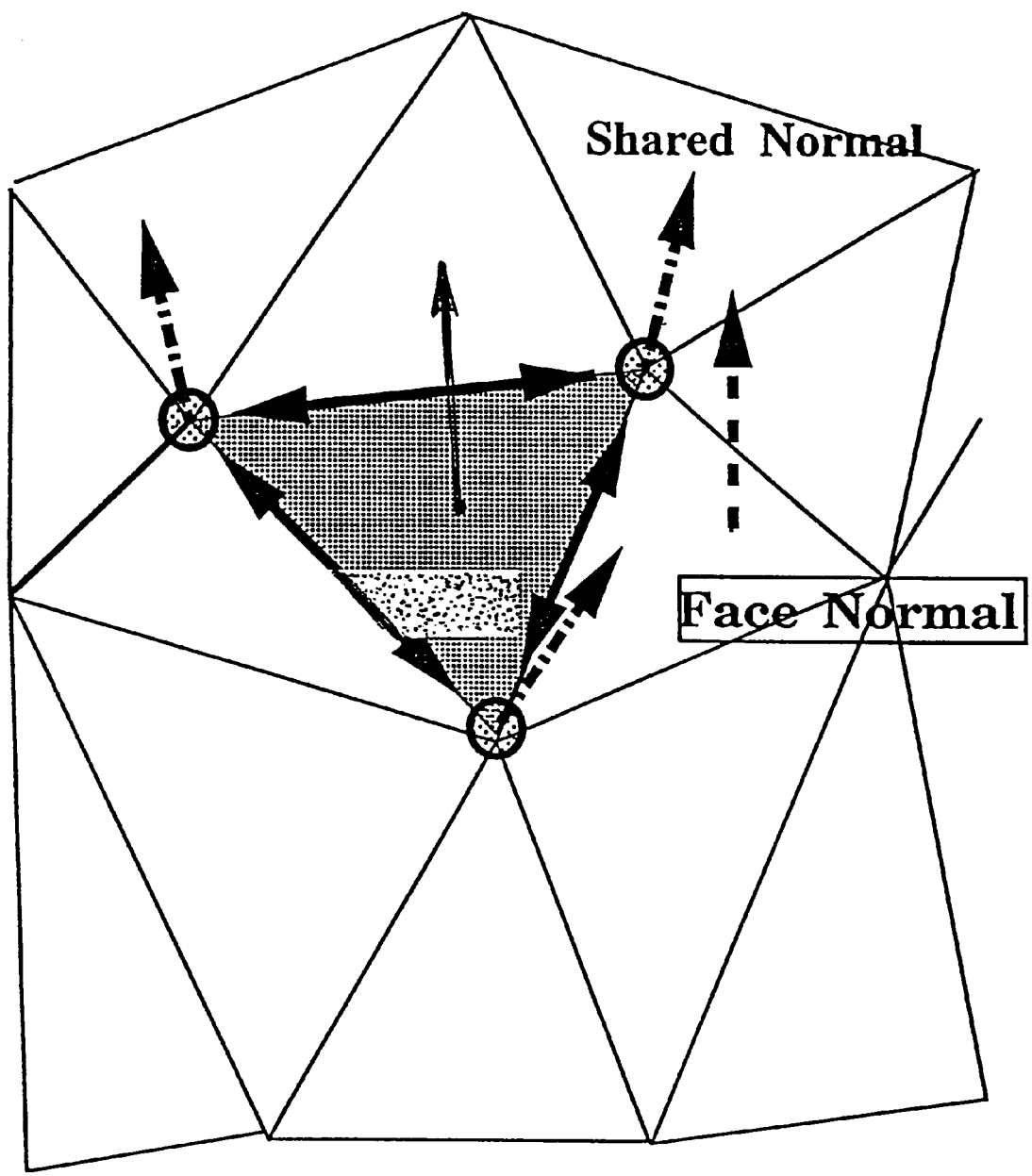
FIG. 17 shows triangle face and vertex normal vectors.

Specifically, in order to produce smoothly shaded images, the unit normal of all triangles sharing a common vertex is averaged together at the vertex to produce a shared, or vertex normal. Each triangle normal is computed as the vector cross product of two defining edges. FIG. 17 presents an illustration of the concepts. The graphics processor 70 can then use the shared normals, to grade the calculated intensity over the triangle to create a smoothly shaded image having a natural appearance. Different coloring can also be used in the processor to provide better visual separation of the individual surface tiles, and of different objects or structures.

Figure 18:
FIGS. 18 and 19 illustrate the medical imaging surfaces rendered in accordance with the method of the present invention.
Figure 19:
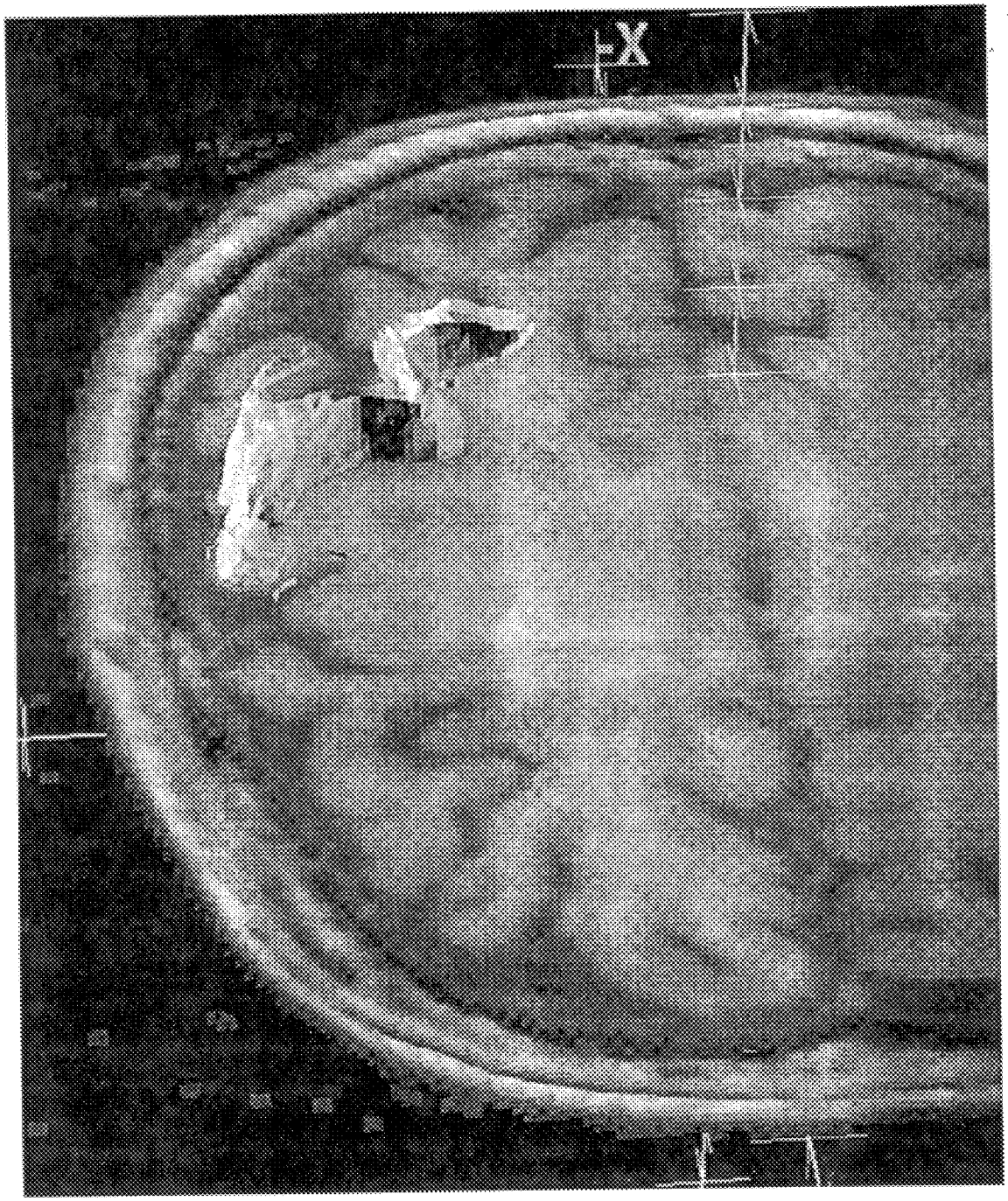

Since the computation of the vertex normals in accordance with the present invention uses localized planar triangle information, as opposed to other known methods of computing surface normals which typically use the volume gradient case, when closely positioned isosurfaces need to be discriminated, the method of the present invention provides a better surface separation. FIGS. 18 and 19 show examples of medical imaging surfaces, rendered in accordance with the method of the present invention.

It is to be understood that the claimed invention is not to be limited to the description of the preferred embodiment but encompasses other modifications and alterations within the spirit of the inventive concept which scope is defined by the following claims.

What is claimed is:

1. A method for rendering a three-dimensional (3D) surface structure on a display device of a computer graphics display system using information from sequenced image slices Produced by a non-invasive data gathering device, comprising the steps of:
   a) generating a 3D field of data representing the values of at least one physical property associated with a 3D body by a nonintrusive cross-sectional image gathering device;
   b) storing the generated 3D field of data at regularly spaced grid locations defining voxels within said body, each voxel having eight vertex values and six faces;
   c) selectively retrieving the eight voxel vertex values of said physical property for a voxel which is intersected by the surface structure;
   d) determining which voxel vertex values are inside and which voxel vertex values are outside of the surface structure;
   e) computing, for each voxel face having at least one voxel vertex inside and at least one voxel vertex outside of the surface structure, coordinate values of the intersect between the voxel face and the surface structure;
   f) forming, for each intersect of a voxel face with the surface structure, a triangle having a third vertex in the interior of the voxel to obtain an approximation of the surface structure in the interior of the voxel; and
   g) generating image data associated with the formed triangle, said data being displayable at a display position corresponding to the position of the voxel on the surface structure.

2. The method of claim 1 wherein step d) further comprises the step of comparing each voxel vertex value with a predetermined threshold, the value of said threshold corresponding to the surface structure.

3. The method of claim 2 wherein at step e) the computation of the intersect coordinate values is done by a linear interpolation of the voxel vertex values.

4. The method of claim 3 wherein at step f) the physical location of the third vertex of each approximating triangle is identical and is computed as the centroid of all interpolated intersect coordinate values.

5. The method of claim 4 further comprising the steps of:
   h) identifying each adjacent voxel, sharing a face intersect with the surface structure; and
   i) recursively applying steps c), d), e), f), g) and h) to each identified voxel until all face-adjacent voxels within the three-dimensional body having a face intersect with the surface structure are processed.

6. The method of claim 5 wherein in the step of recursively computing the intersect coordinates, only coordinate values that have not previously been computed are processed.

7. The method of claim 5 further comprising the step of displaying a two-dimensional image of the approximated surface structure.

8. The method of claim 7 wherein the surface structure is displayed by utilizing only the identified voxels.

9. A method for rendering of an internal surface structure within a three-dimensional (3D) body on a display device of a computer graphics display system using information from sequenced image slices produced by a non-invasive data gathering device, comprising the steps of:
   a) generating a 3D field of data representing the values of at least one physical property associated with the 3D body by a nonintrusive cross-sectional image gathering device;
   b) storing the generated 3D field of data at regularly spaced grid locations defining voxels within said body, each voxel having associated with it vertex locations and voxel faces, each two intersecting voxel faces defining a voxel edge, said voxel edge passing through two voxel vertices;
   c) selectively accessing two voxel vertices of a voxel edge for a voxel which is intersected by the surface structure;
   d) determining which voxel vertex of the selected voxel edge is inside and which voxel vertex of the selected edge is outside of the surface structure;
   e) computing, for each selected voxel edge having at least one voxel vertex inside and at least one voxel vertex outside of the surface structure, a coordinate value of a first hit location where the surface structure crosses the voxel edge;
   f) examining each of the two intersecting voxel faces defining the selected voxel edge for a second hit location defining an intersect between the surface structure and the voxel face, said intersect passing through said first and said second hit locations;
   g) forming, for each intersect of a voxel face with the surface of interest, a triangle with a vertex in the interior of the voxel to obtain an approximation to the surface structure in the interior of the voxel; and
   h) generating image data associated with the formed triangle, said data being displayable at a display position corresponding to the position of the voxel on the surface structure.

10. The method of claim 9 wherein step d) further comprises the step of comparing each voxel vertex value with a predetermined threshold, the value of said threshold corresponding to the surface structure.

11. The method of claim 10 wherein at step e) the computation of the intersect coordinate values is done by a linear interpolation of the voxel vertex values.

12. The method of claim 11 wherein at step f) the location of the third vertex of each approximating triangle is computed as the centroid of the interpolated intersect coordinate values forming a closed contour around the inside voxel vertex.

13. The method of claim 12 further comprising the steps of:

i) identifying each adjacent voxel, sharing a face intersect with the surface structure; and j) recursively applying steps c), d), e), f), g), h) and i) to each identified voxel until all face-adjacent voxels within the three-dimensional body having a face intersect with the surface structure are processed.

14. The method of claim 13 wherein in the step of recursively computing the intersect coordinates, only coordinate values that have not previously been computed are processed.

15. The method of claim 13 further comprising the step of displaying a two-dimensional image of the approximated surface structure.

16. The method of claim 15 wherein the surface structure is displayed by utilizing only the generated image data associated with the formed triangles in the identified voxels.

17. The method of claim 9 wherein the planar arrangement of the regularly spaced grid-locations is other than a rectangular array.

18. The method of claim 9 wherein said second hit location being closer to the inside voxel vertex as compared to the outside voxel vertex of the selected edge.

19. A computer graphics display system for analysis and display of three-dimensional (3D) iso-value surface structures using information obtained from sequenced image slices produced by a non-invasive data gathering device, comprising:

first storage means for storing three-dimensional signal patterns representing the value of at least one physical property associated with a three dimensional body at regularly spaced grid locations within said body, a voxel being defined by a set of adjacent locations in the three-dimensions spaced grid, each voxel having voxel edges and voxel faces associated with it;

means for defining a plane of pixel positions having preselect position density and corresponding to one plane of said spaced grid locations;

means for determining a pixel on a plane defined by said means for defining, said pixel being associated with a voxel that is intersected by a surface structure of interest within said body;

processing means for computing coordinate values of the cross-section between the surface structure of interest and the intersected voxel edges and for computing the coordinate values of at least one articulating location positioned in the interior of the intersected voxel;

second storage means for storing the computed coordinate values along with connectivity information about joining the computed coordinate values into a set of triangles, each triangle having one triangle edge on a voxel face and one triangle vertex at an articulating location in the interior of the intersected voxel;

display processor means receiving data from said second storage means and converting the received data about the set of triangles to a display format; and means for interactively displaying surface structures of interest, said means for interactively displaying being driven by said display processor means.

20. The system of claim 19 wherein said processing means further comprises first generating means for generating the unit normal vectors of each set of triangles associated with a location having computed coordinate values.

21. The system of claim 20 wherein said processing means further comprises second generating means for generating shared normal vectors associated with the voxel locations having computed coordinate values, said shared normal vectors being generated on the basis of the triangle normal vectors generated by said first generating means and said shared normal vectors being stored in said second storage means.

22. The system of claim 21 wherein the display processor means uses said stored shared normal vectors for providing to the display means image data which, when displayed, produces different appearance of different surface structure locations being displayed, said appearance being dependent on said shared normal vectors.

23. The system of claim 19 wherein the processing means further comprises means for identifying which of the voxels sharing a voxel face with the intersected voxel are intersected by the surface structure of interest.

24. The system of claim 23 wherein the processing means further comprises means for generating, for each voxel identified as being intersected, a plurality of index values representing information about the voxel face intersects shared, said plurality of index values being stored in said second storage means.

25. The system of claim 19 wherein the processing means further comprises means for retrieving signal patterns associated with each grid location and means for providing the three-dimensional location associated with each said grid location.

26. The system of claim 19 wherein said processing means comprises means for simultaneously comparing all vertex values of said intersected voxel to a value of said at least one physical property indicative of the surface structure of interest, the output of said means for simultaneously comparing being used to compute the coordinate values of the cross-section independently for each voxel face.

27. The system of claim 19 further comprising variable means for adaptively selecting the position density of the pixels of said defined pixel plane.

28. The system of claim 19 further comprising structure analysis means receiving input from said second storage means and capable of producing on output global structure parameters.

* * * * *